US010666055B2

(12) United States Patent
Garrity et al.

(10) Patent No.: US 10,666,055 B2
(45) Date of Patent: May 26, 2020

(54) PORTABLE POWER SYSTEM

(71) Applicant: Garrity Power Services LLC, Rockwall, TX (US)

(72) Inventors: Paul Garrity, Rockwall, TX (US); Aaron Jungreis, Ra'anana (IL)

(73) Assignee: Garrity Power Services LLC, Rockwall, TX (US)

(*) Notice: Subject to any disclaimer, the term of this patent is extended or adjusted under 35 U.S.C. 154(b) by 605 days.

(21) Appl. No.: 15/372,140

(22) Filed: Dec. 7, 2016

(65) Prior Publication Data
US 2017/0179726 A1 Jun. 22, 2017

Related U.S. Application Data

(60) Provisional application No. 62/268,985, filed on Dec. 17, 2015.

(51) Int. Cl.
*H02J 7/35* (2006.01)
*H02J 3/38* (2006.01)
(Continued)

(52) U.S. Cl.
CPC ............ *H02J 3/383* (2013.01); *H02J 7/35* (2013.01); *H02J 50/10* (2016.02); *H02M 7/4807* (2013.01)

(58) Field of Classification Search
CPC ............ H02J 3/383; H02J 50/10; H02J 7/355; H02M 7/4807
See application file for complete search history.

(56) References Cited

U.S. PATENT DOCUMENTS 5,969,501 A * 10/1999 Glidden ............... H02S 30/20
320/101
5,978,236 A * 11/1999 Faberman ............ H02J 9/061
307/66
(Continued)

FOREIGN PATENT DOCUMENTS

EP 2512002 A2 * 10/2012 ............ H02J 7/0027
WO WO-2013059441 A1 * 4/2013

OTHER PUBLICATIONS

Tom Curatolo, "Load-Sharing Power Converters Tackle Higher Output Power and Fault Tolerance," Oct. 8, 2009, Electronic Design, pp. 1-11 (Year: 2009).*
(Continued)

*Primary Examiner* — Pinping Sun
(74) *Attorney, Agent, or Firm* — Hovey Williams LLP

(57) ABSTRACT

A hand carryable apparatus comprising a first power system, a second power system, a mechanical coupling, and an electrical coupling. The first power system comprises a first enclosure, a photovoltaic panel, a first power inverter, and a first alternating current interface coupled to the first output of the first power inverter. The second power system comprises a second enclosure, a battery, a second power inverter, and a second alternating current interface coupled to the second output of the second power inverter. The mechanical coupling and the electrical coupling removably couple the first power system to the second power system. The electrical coupling is capable of passing power between the first power system and the second power system. The second power system is capable of operating independently of the first power system.

20 Claims, 20 Drawing Sheets

(51) Int. Cl.
*H02M 7/48* (2007.01)
*H02J 50/10* (2016.01)

(56) References Cited

U.S. PATENT DOCUMENTS

| | | | | | |
|---|---|---|---|---|---|
| 6,311,279 | B1* | 10/2001 | Nguyen | ............ | G06F 1/263 307/66 |
| 6,541,940 | B1* | 4/2003 | Jungreis | ............ | H01M 10/4207 320/103 |
| 6,950,030 | B2* | 9/2005 | Kovarik | ............ | G01R 31/388 340/636.1 |
| 7,078,825 | B2* | 7/2006 | Ebrahim | ............ | H02P 9/04 290/52 |
| 7,183,667 | B2* | 2/2007 | Colby | ............ | H02J 3/42 307/19 |
| 7,394,166 | B2* | 7/2008 | Teichmann | ............ | H02J 3/38 290/44 |
| 7,619,323 | B2* | 11/2009 | Tan | ............ | H02J 1/10 307/82 |
| 7,791,311 | B2* | 9/2010 | Sagoo | ............ | H02J 7/025 320/108 |
| 7,898,212 | B2* | 3/2011 | Benn | ............ | F24S 30/452 320/101 |
| 7,928,699 | B2* | 4/2011 | Kohn | ............ | H02J 7/0091 180/65.29 |
| 8,526,206 | B2* | 9/2013 | Fotherby | ............ | H02M 1/08 327/424 |
| 9,450,363 | B2* | 9/2016 | Ghosh | ............ | H01R 31/065 |
| 2003/0113595 | A1* | 6/2003 | Jungreis | ............ | H01M 8/0494 429/430 |
| 2005/0052085 | A1* | 3/2005 | Chang | ............ | H02J 9/061 307/66 |
| 2005/0146223 | A1* | 7/2005 | Kanouda | ............ | G06F 1/30 307/66 |
| 2009/0219075 | A1* | 9/2009 | Steuber | ............ | H02M 7/53871 327/423 |
| 2010/0279166 | A1* | 11/2010 | Tseng | ............ | H01M 10/42 429/123 |
| 2011/0038086 | A1* | 2/2011 | Eggert | ............ | H02M 5/257 361/93.9 |
| 2011/0089881 | A1* | 4/2011 | Shibuya | ............ | F04B 39/121 318/472 |
| 2013/0274946 | A1* | 10/2013 | Schelenz | ............ | H02J 3/383 700/297 |
| 2014/0082393 | A1* | 3/2014 | Liang | ............ | G06F 1/3212 713/323 |
| 2015/0109833 | A1* | 4/2015 | Garrity | ............ | H02M 1/36 363/37 |
| 2016/0141879 | A1* | 5/2016 | Motsenbocker | ............ | G05F 1/67 307/18 |
| 2016/0181871 | A1* | 6/2016 | Krumme | ............ | A61B 6/03 307/104 |
| 2017/0085087 | A1* | 3/2017 | Rogers | ............ | H02J 3/14 |

OTHER PUBLICATIONS

Ye, et.al., "Extract maximum power from the supply when charging a battery," 2014, Text Instruments, pp. 9-13 (Year: 2014).*

* cited by examiner

PORTABLE POWER SYSTEM

RELATED APPLICATIONS

This patent application claims priority benefit to a provisional patent application titled "Portable Power System" U.S. Application No. 62/268,985, filed Dec. 17, 2015, incorporated by reference herein in its entirety.

TECHNICAL FIELD

The present invention is directed, in general, to electric power inverters and, more specifically, to an apparatus to provide a portable power source.

BACKGROUND

Photovoltaic systems have become more prevalent as prices decrease. Most photovoltaic systems are grid-connected-only systems that offset electric utility costs. These grid-connected systems usually pay for themselves in ten to thirty years depending on the installation location and government subsidies offered at the time of installation.

Other photovoltaic systems which are currently less prevalent are used to create alternating current power in the absence of a connection to the utility. These stand-alone systems are used either to provide backup power or to power loads in a remote location. Stand-alone systems are usually expensive due to the need for battery storage and for the additional inverter costs associated with providing power to non-resistive loads. Furthermore, the batteries of such systems are heavy, not easily moved, and are designed to be used only inside the photovoltaic system.

Very small photovoltaic applications exist with or without batteries for the purpose of operating very small electronic devices such as solar calculators or cell phones. These systems are low in power and can only be used for a narrow range of low-power devices. Furthermore, the battery in such systems, if there is a battery, is dedicated to use in the photovoltaic system and cannot be easily used for other applications. Furthermore, these low power applications are designed only for stand-alone applications—the photovoltaic panel is wasted most of the time since the power it can produce most of the time is not needed for the intended load but also cannot be pushed into the grid to save electricity costs.

Conventional photovoltaic systems are not easily reconfigurable and often present safety or interconnection issues. For example, the battery of a conventional photovoltaic system cannot be removed for other applications while the photovoltaic panel continues to either source power into the utility grid or produce AC power without a utility grid present.

SUMMARY OF THE INVENTION

These and other problems are generally solved or circumvented, and technical advantages are generally achieved, by advantageous embodiments of the present invention, including a hand carryable apparatus comprising a first power system, a second power system, a mechanical coupling, and an electrical coupling. The first power system comprises a first enclosure, a photovoltaic panel, a first power converter, and a first electrical interface coupled to the first power converter. The second power system comprises a second enclosure, a battery, a second power converter, and a second electrical interface coupled to the second power converter. The mechanical coupling and the electrical coupling removably couple the first power system to the second power system. The electrical coupling is capable of passing power between the first power system and the second power system. The second power system is capable of operating independently of the first power system.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

Figure 1:
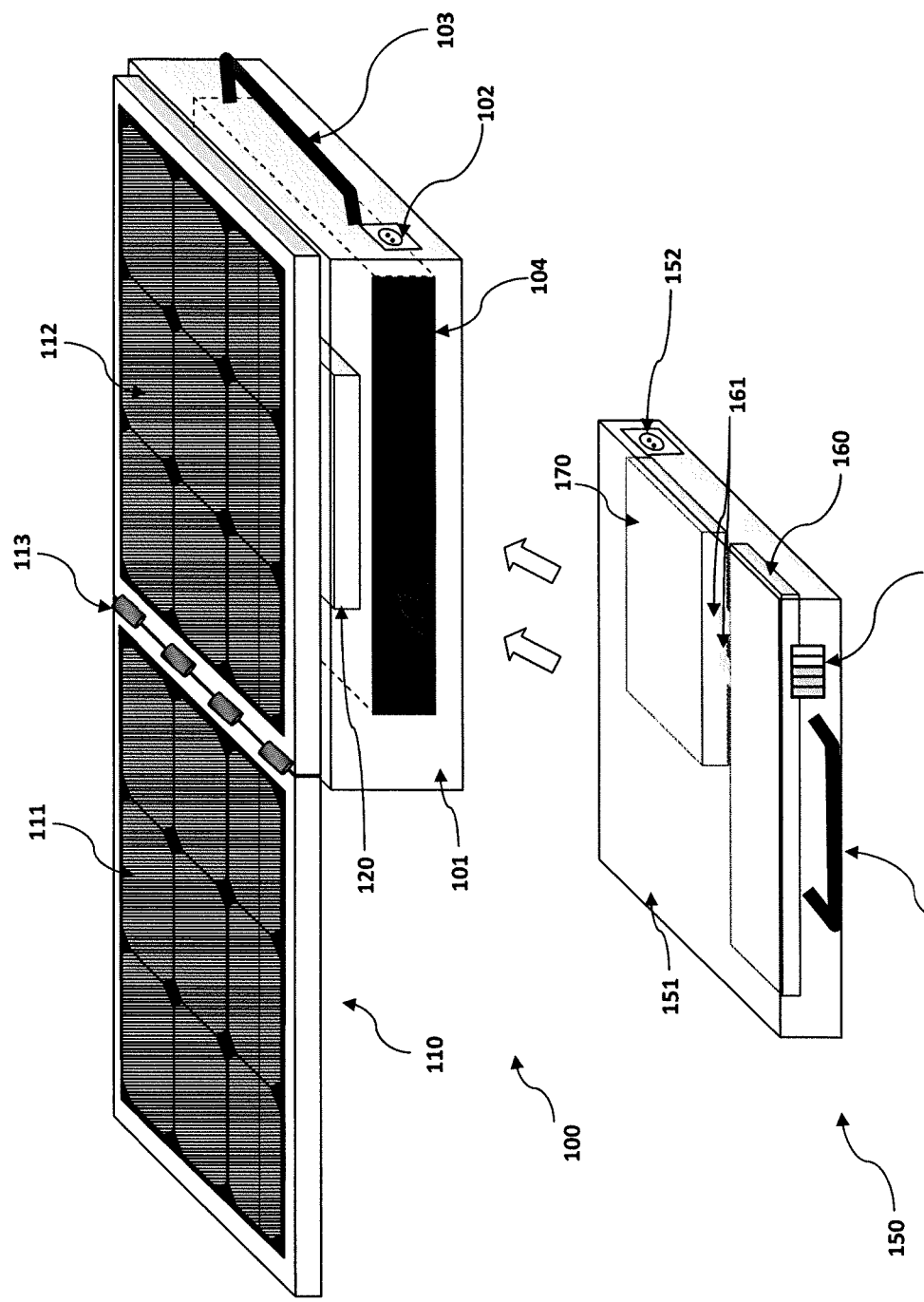
FIG. 1 is a perspective view of a hand carryable portable power system constructed in accordance with an embodiment of the invention.

FIG. 1 illustrates an embodiment of a portable power system that has a size and weight making it relatively easy to carry by hand without any additional lifting aids. For example, the portable power system of FIG. 1 could be carried similar to the way one would carry a briefcase and the overall mass might be 5 to 15 kilograms and the largest linear dimension might be 40 to 50 centimeters. Such a portable power system will henceforth be referred to as a hand carryable portable power system.

Figure 3:
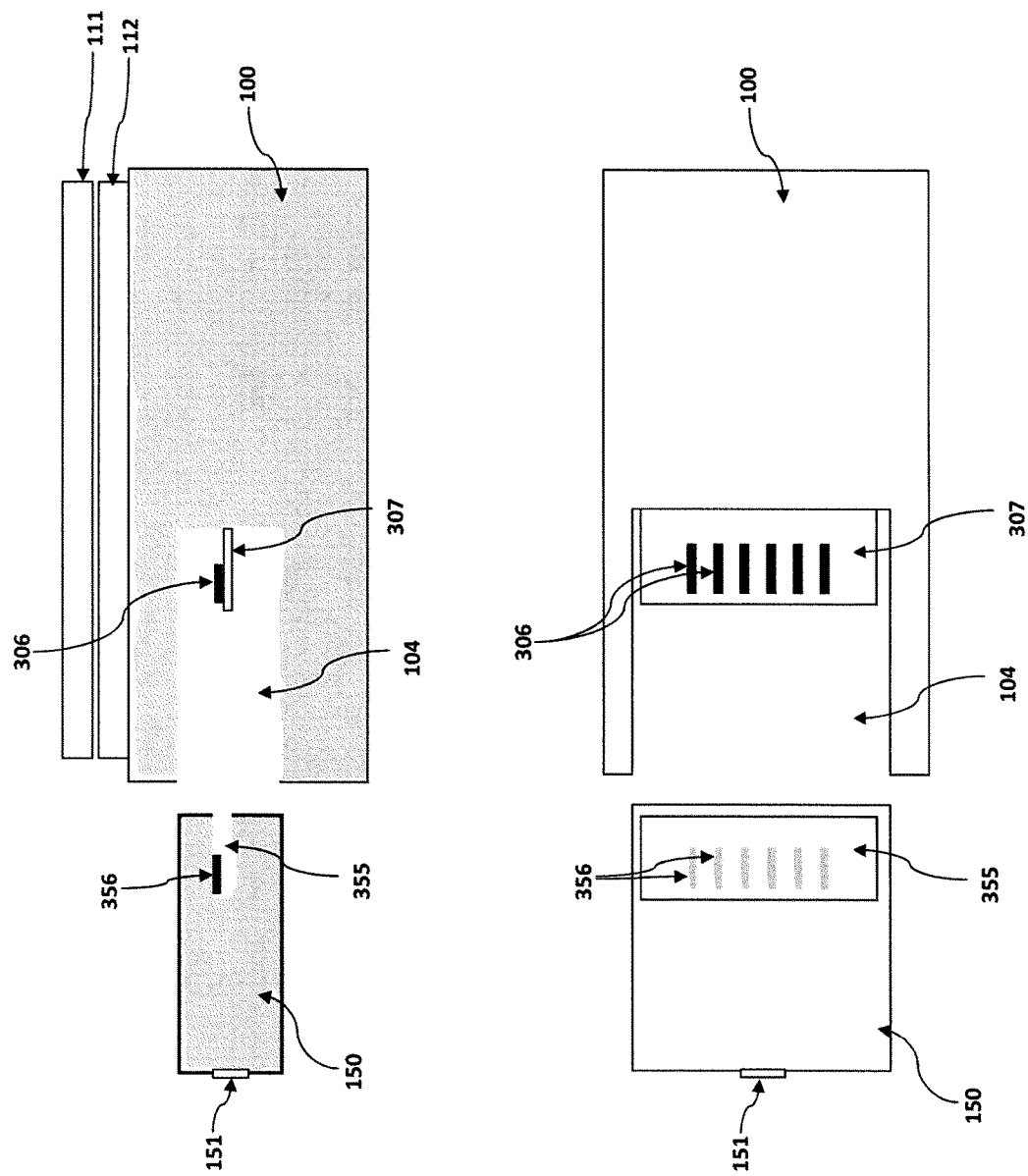
FIG. 3 is an enlarged cross sectional elevation view and an enlarged cross-sectional plan view of the electrical coupling mechanism of the hand carryable portable power system shown in FIG. 1.

The hand carryable portable power system in FIG. 1 comprises a first power system which will be referred to as PV box 100 (i.e. photovoltaic box) in the subsequent discussions, a second power system which will be referred to as battery box 150 in the subsequent discussions, a mechanical coupling that comprises a slot 104 configured to receive the battery box 150, and an electrical coupling which cannot be seen in this figure but is shown in more detail in FIG. 3 and subsequently described in more detail. The PV box 100 comprises a first enclosure 101, a photovoltaic panel 110, a first power inverter 120, and a first alternating current interface 102 that is coupled to an output of first power inverter 120. The battery box 150 comprises a second enclosure 151, a battery 160 having terminals 161, a second power inverter 170, and a second alternating current interface 152 that is coupled to an output of the second power inverter 170. The first alternating current interface 102 and second alternating current interface 152 are both shown as standard European 230 VAC outlets. Other alternating current interfaces could have been used as well such as (but not limited to) universal outlets, US 115 VAC outlets, or standard photovoltaic system alternating-current (AC) cables.

The battery box 150 is shown with an LED indicator 151 which is used to visually indicate a state-of-charge of the battery 160. LED indicator 151 is visible whether or not battery box 150 is inserted into slot 104. Handle 153 can be used to carry battery box 150 brief-case style.

The PV box 100 also has a handle 103. Handle 103 is similarly used to carry the PV box 100 brief-case style whether or not battery box 150 is inserted into PV box 100.

The battery box 150 is self-contained and is thus able to operate independently of the PV box 100. Similarly, the PV box 100 is self-contained and is able to operate independently of the battery box 150. However, when battery box 150 is inserted into PV box 100, the electrical coupling (which is not shown in FIG. 1) allows the battery box 150 and the PV box 100 to transfer signals and power between each other to allow several advantageous modes of operation including but not limited to the following:

The PV panel 100 can provide power to charge battery 160.

The battery 160 can provide load leveling power to provide incremental power to the load when the power capacity of PV panel 100 is below the level of the load.

The power from the PV panel 100 and the power from the battery 160 are channeled to a single alternating current interface 102 allowing the two combined systems (100 and 150) to provide greater net power to a load than either of the two systems individually, thus allowing operation of larger loads than can be accomplished from either of the two systems individually.

In addition to some of the advantages listed above for the present invention, other advantages exist by allowing the battery box 150 to be removable from the PV box 100 such that each of the two power systems (100 and 150) are able to operate independently.

The battery box 150 weighs much less than the combination of the PV box 100 and the battery box 150 together. For circumstances that require less weight and limited energy storage, it is useful to be able to remove battery box 150.

The PV inverter 120 can push power into the grid, thus reducing household electricity costs. Pushing power into the grid does not require presence of a battery thus freeing the battery box 150 for other uses.

Some load applications, particularly charging of battery-operated devices such as laptop computers and cell phones, do not require continuous power. These loads can profit from connection to the PV box 100 without the presence of the battery box 150, thus freeing the battery box 150 for other uses.

Photovoltaic panel 110 comprises PV panel section 111, PV panel section 112, and hinge 113. The use of multiple panel sections allows the photovoltaic panel 110 to occupy significantly more area than the largest face of the PV box 100 when the photovoltaic panel 110 is open, but less area than the largest face of the PV box 100 when the photovoltaic panel 110 is closed. The feature of a foldable panel thus facilitates transport of the portable power system by hand carrying while allowing the portable power system to have a much higher power rating than would otherwise be possible. The hinge 113 should be designed so that when the photovoltaic panel 110 is open, the panel section 111 remains in a fixed position relative to panel section 112 to maximize exposure to sunlight of all three panel sections simultaneously.

Figure 2:
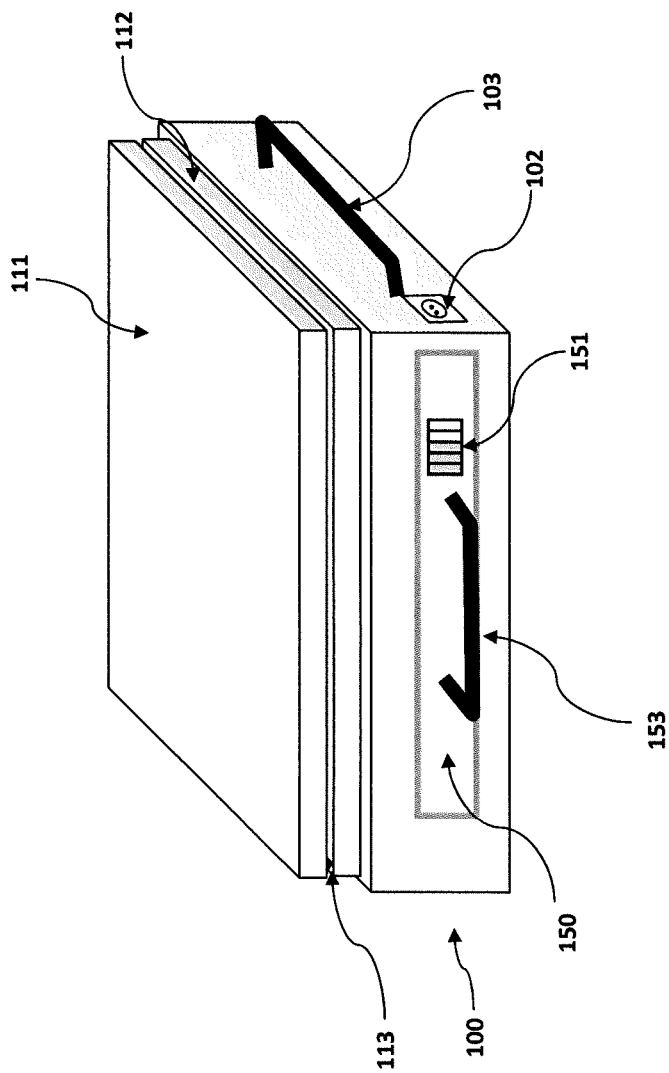
FIG. 2 is a perspective view of the hand carryable portable power system shown in FIG. 1 in a closed configuration.

FIG. 2 shows the portable power system of FIG. 1 in which photovoltaic panel 110 has been closed and in which battery box 150 has been inserted into PV box 100. Note that when the photovoltaic panel 110 has been closed, its surface area is smaller than the largest face of PV box 100. Also note that when battery box 150 is inserted into PV box 100 that the alternating current interface 102 on the PV box 100 is still visible but the alternating current interface 152 on the battery box 150 is no longer visible. Alternating current interface 152 is not needed when battery box 150 is inserted into PV box 100 because the electrical interface between the two power systems allows coupling power from both systems to alternating current interface 102.

FIG. 3 illustrates two cross-sectional drawings of the portable power system of FIG. 1 in which the photovoltaic panel 110 has been folded. The purpose of these two cross-sectional drawings is to provide detail of the electrical interface that joins the battery box 150 to the PV box 100 when the former is inserted into the latter. The upper drawing is a side-view cross-section intersecting the LED panel 151. The lower drawing is a top-view cross-section also intersecting the LED panel 151. The cross-sectional drawings of FIG. 3 do not provide every detail of components inside each of the two power systems, but rather only enough detail to understand the electrical interface.

The electrical interface shown in FIG. 3 comprises slot 355 and conductors 356 inside battery box 150 as well as ledge 307 and conductors 306 inside PV box 100. Ledge 307 and conductors 306 are located inside slot 104 in such a way that when battery box 150 is inserted into PV box 100, conductors 356 contact conductors 306.

Ledge 307 preferably comprises a printed circuit board but other materials or combinations of materials could be used as well. Furthermore, other methods common in the art can be employed to produce an electrical interface such as a connector. What is important is that conductors 356 and 306 are not exposed to human contact when the battery box 150 is not inserted into the PV box 100.

Figure 4:
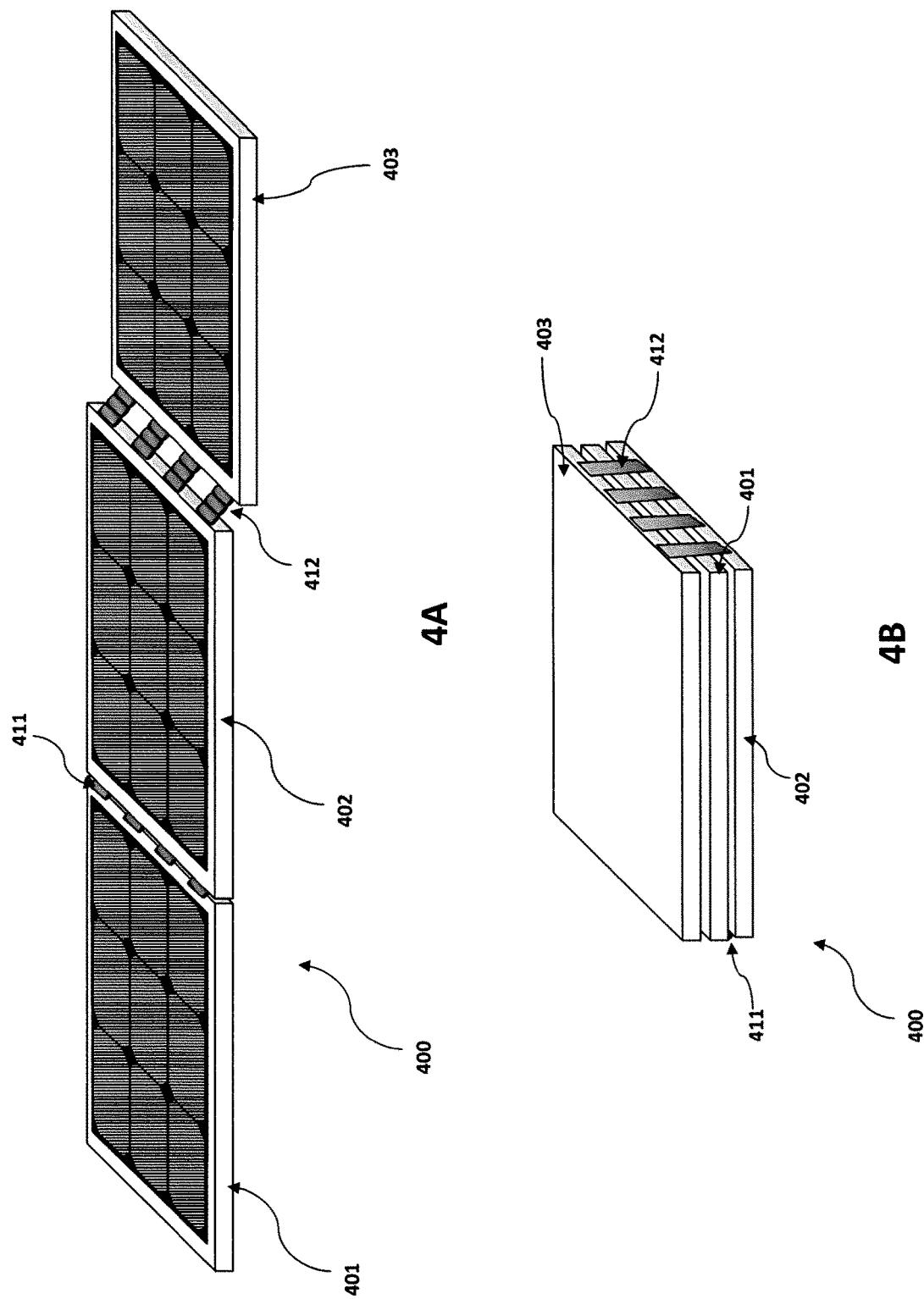
FIG. 4 is a perspective view of a foldable photovoltaic panel for use in a hand carryable portable power system.

FIG. 4 illustrates another embodiment of a foldable photovoltaic panel 400 for use in a portable power system. Photovoltaic panel 400 comprises photovoltaic panel sections 401, 402, and 403 as well as hinges 411 and 412. The top portion of FIG. 4 (denoted "4A") shows panel 400 open and the bottom portion of FIG. 4 (denoted "4B") shows panel 400 closed. The hinges 411 and 412 should be designed so that when the panel is open, the panel sections 401 and 403 remain in a fixed position relative to panel section 402 to maximize exposure to sunlight of all three panel sections simultaneously. The concept of a foldable panel can be expanded to additional panel sections and is limited primarily by cost and weight for a system which can be easily hand carried.

Figure 5:
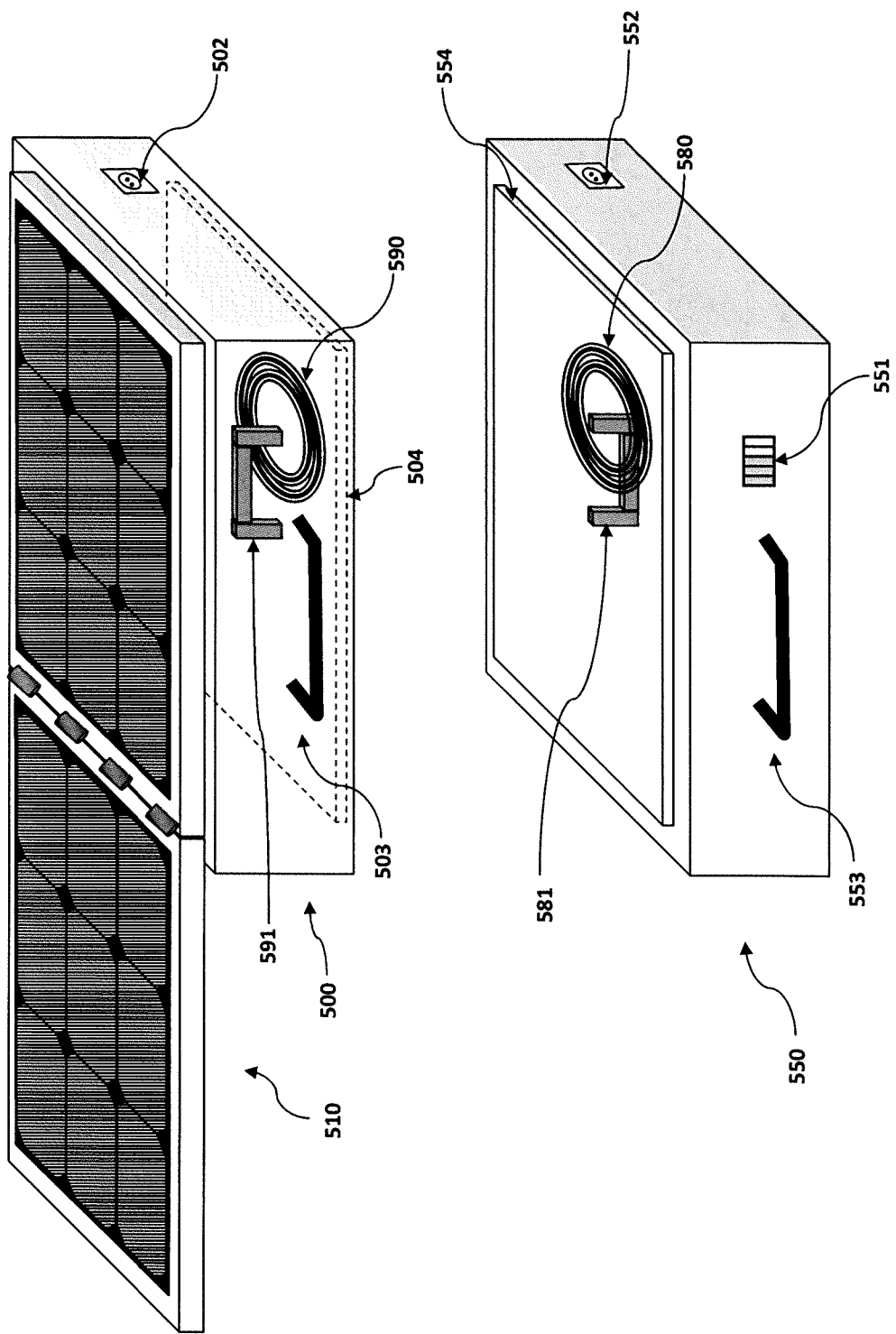
FIG. 5 is a perspective view of a hand carryable portable power system constructed in accordance with another embodiment of the invention.

FIG. 5 illustrates another embodiment of a hand carryable portable power system. The system illustrated in FIG. 5 is similar to the system illustrated in FIG. 1 with two main differences:

The system illustrated in FIG. 5 provides a mechanical alignment method of stacking PV box 500 onto battery box 550 rather than using a slot for inserting the battery box 550 into PV box 500.

The system illustrated in FIG. 5 uses wireless power transmission to couple power and signals between PV box 500 and battery box 550.

Aside from the two differences noted above, the system illustrated in FIG. 5 operates the same way and provides the same functions as the system illustrated in FIG. 1. The following components in FIG. 5 function similarly to corresponding components in FIG. 1 and will therefore not be described in details for purposes of brevity: 502 to 102, 503 to 103, 510 to 110, 551 to 151, 552 to 152, and 553 to 153. Rather than using a slot, the portable power system of FIG. 5 uses cavity 504 at the bottom of PV box 500 and the platform 554 on top of battery box 550 to align PV box 500 to battery box 550.

Wireless coil 580 in battery box 550 and wireless coil 590 in PV box 500 are coupled to each other when PV box 500 is placed on top of battery box 550. Aligning the two power systems to each other causes wireless coils 580 and 590 to be aligned to each other as well, so the coupling between these two coils can be quite high. Optional magnetic material 581 and 591 helps complete a magnetic loop through coils 580 and 590 to increase the coupling to extremely high levels and allow highly efficient power transfer between wireless coils 580 and 590. Communication signals can also be transferred between wireless coils 580 and 590 using back-scatter modulation or other techniques which are well-known in the art of wireless power transfer.

The system shown in FIG. 5 provides several benefits compared to the system shown in FIG. 1. One benefit is the ability to increase water resistance of the power system. Another benefit is elimination of contact wear. A third benefit is ease of design for safety. A fourth benefit is reliability of the electrical connection method since there are no physical electrical contacts.

While the hand carryable portable power system illustrated in FIG. 5 differs from that illustrated in FIG. 1 in both electrical and mechanical coupling, it is possible to also produce a portable power system that differs in only one of these two aspects. For example, one can produce a portable power system that uses wireless power transfer for the electrical coupling, but uses a slot for the mechanical coupling. One can also produce a portable power system that uses electrical contacts for the electrical coupling, but uses a stacking aligner for the mechanical coupling provided that the electrical coupling uses electrical contacts that are not accessible when the two power systems are separated.

Figure 6:
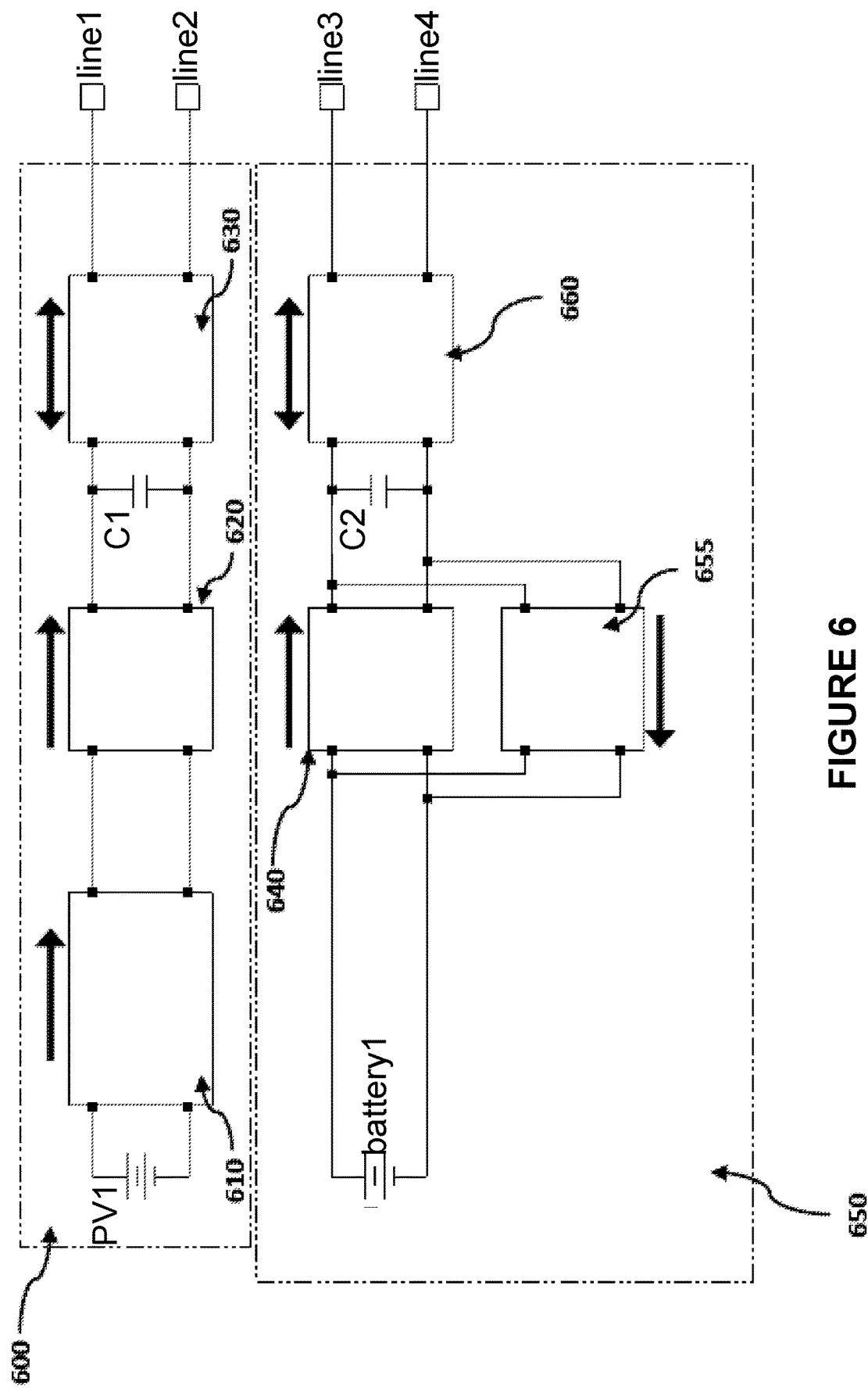
FIG. 6 is a simplified schematic diagram of an embodiment of a hand carryable portable power system.

FIG. 6 illustrates a simplified schematic block diagram of an embodiment of a hand carryable portable power system. System 600 represents a PV power system and system 650 represents a battery power system when the PV power system and battery power system are operating independently. The arrows above each block inside systems 600 and 650 represent possible directions of power flow in each block.

Looking first at PV power system 600: photovoltaic voltage PV1 is boosted by a non-isolated boost converter 610. The boosted voltage output from 610 is then sent through a direct-current-to-direct-current (DC-to-DC) isolation stage 620. Isolation stage 620 acts as both an isolation stage and as a regulation stage. Capacitor C1 is located at the direct-current output of isolation stage 620. The voltage across C1 is typically held at about 450V if the portable power system is designed to operate at 230 VAC. If the portable power system is designed to operate at 115 VAC, the voltage across C1 could optionally be reduced to about 250V.

Full-bridge inverter 630 changes the direct-current voltage across capacitor C1 into an alternating-current voltage across line1 and line2. The voltage from line1 to line2 represents the output voltage of the inverter. As shown by the double-sided arrow above full-bridge inverter 630, this inverter is capable of causing power flow either from the output (line1 to line2) to capacitor C1 or from capacitor C1 to the output. Full-bridge inverter 630 is capable of functioning as either a voltage source or a current source. PV power system 600 can therefore act as either a current source to push current into the utility grid or as a stand-alone voltage source to power an alternating-current load.

Looking now at battery power system 650: battery voltage battery1 is sent through DC-to-DC isolation stage 640 which is identical to isolation stage 620. The voltage across C2 is similar to the voltage across C1 (e.g. 450V for 230 VAC systems and 250V for 115 VAC systems). Full-bridge 660 is identical in design to full-bridge inverter 630 and has the same functionality.

Battery power system 650 also contains charger 655. Charger 655 takes a direct-current voltage across capacitor C2 and converts it into an appropriate voltage or current for charging the battery. Charger 655 also provides isolation. Thus if line3 and line4 are connected to a utility grid voltage, full-bridge inverter 660 will charge capacitor C2 to a target direct-current voltage value (such as 450V) and charger 655 will convert the voltage across capacitor C2 into the voltage needed to charge the battery.

Figure 7:
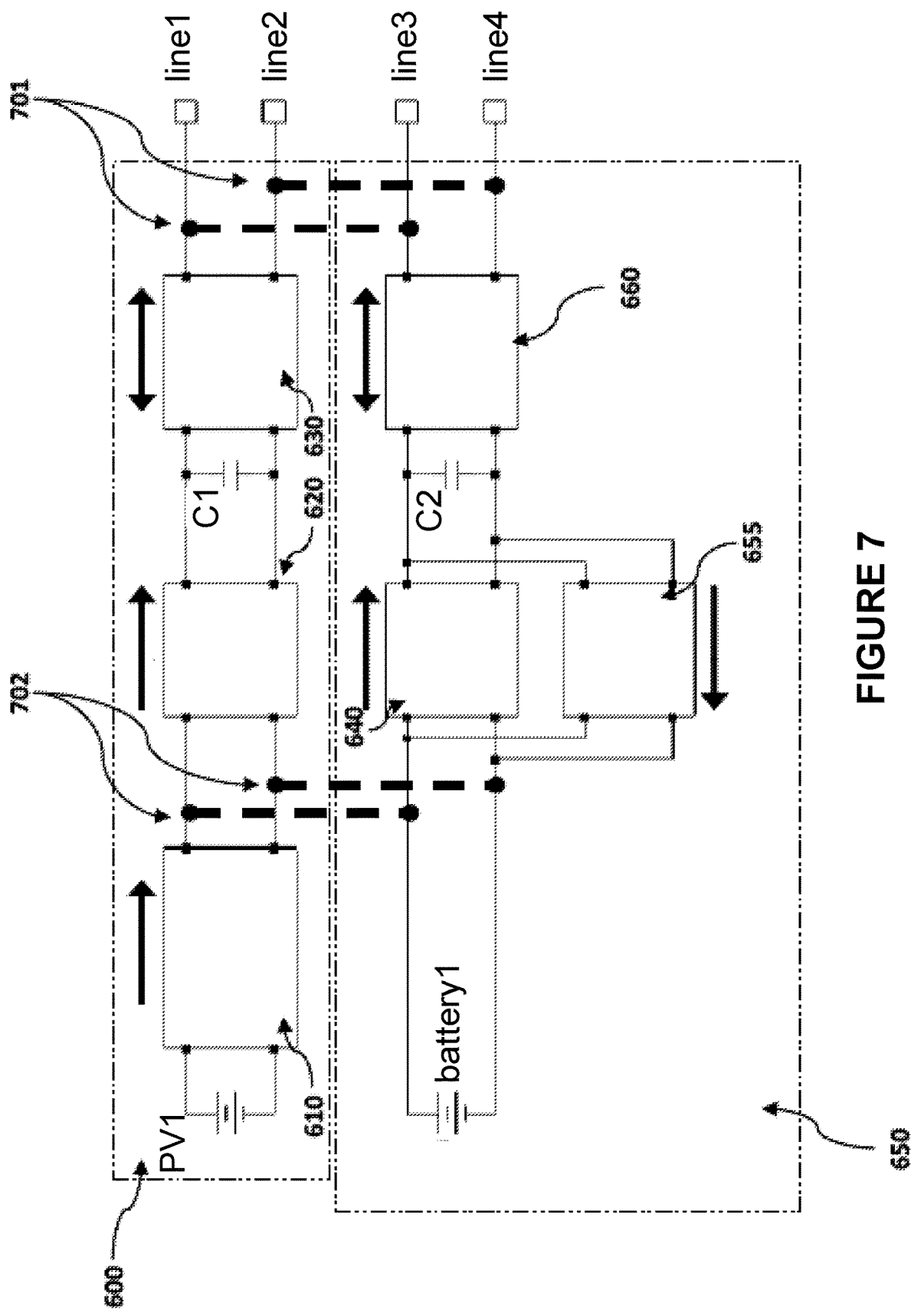
FIG. 7 is a simplified schematic diagram of the hand carryable portable power system of FIG. 6 in another configuration.

FIG. 7 illustrates another configuration of the schematic block diagram illustrated in FIG. 6 when the battery power system 650 is electrically coupled to the PV power system 600. Dashed lines 701 and 702 illustrate the power connections made through the electrical coupler. Power connection 701 causes the output of full-bridge inverters 630 and 660 to be in parallel. Power connection 702 causes the battery to be in parallel with the output from non-isolated boost converter 610.

When power systems 600 and 650 are electrically coupled together as shown in FIG. 7, the overall system is able to function as a single power system. Power connection 701 allows a single load or grid connection between terminals line1 and line2. When the system is connected to the utility grid through line1 and line2, PV power system 600 can push power into the grid just as it could when 600 and 650 were independent of each other. Power connection 702 also allows the charger 655 to charge that battery as it did when the two systems 600 and 650 were independent. It should be noted that when systems 600 and 650 are electrically coupled to each other, the charger 655 can function the same way whether it was included in system 600 or in system 650. An advantage of including the charger 655 in PV system 600 is that it can result in lower size and weight for battery system 650. A further advantage is that PV system 600 is likely to already include a means for connecting to the utility grid to be able to push photovoltaic power into the grid, while the battery system 600 does not need to have any ability to connect to the grid. On the other hand, an advantage of including the charger 655 in battery system 650 is that it allows the battery system 650 to be both charged and discharged independently of PV system 600. Furthermore, if charger 655 is located in battery system 650, it is also possible to incorporate the function of charger 655 into DC-to-DC isolation stage 640 by designing isolation stage 640 to be an isolated bidirectional converter, thereby reducing cost, size, and weight. There are therefore advantages to each location of the charger 655.

When the combined system is operating independently of the utility grid and a load is connected from line1 to line2, non-isolated boost converter 610 boosts voltage PV1 to charge the battery. The battery charging voltage at the output of 610 is then isolated and regulated by isolation stages 620 and 640 to produce a high-voltage (e.g. 450V) across capacitors C1 and C2. Full-bridge inverters 630 and 660 each provide alternating-current voltage output from line1 to line2. If the power capability of the photovoltaic panel is lower than the required load power, the voltage across battery1 will drop until the battery takes up the balance of the required load. Thus, the battery will be charged any time the output load voltage is lower than the power capability of the photovoltaic panel but the battery will always be ready to provide power any time the load power rises or the photovoltaic power capability drops below that of the load.

Non-isolated DC-to-DC converter 610 allows the hand carryable portable power system to quickly change from a charging to discharging mode of the battery; however, converter 610 has several drawbacks: it increases cost, lowers efficiency, and requires additional space. It would therefore be of value to remove this additional power block.

Figure 8:
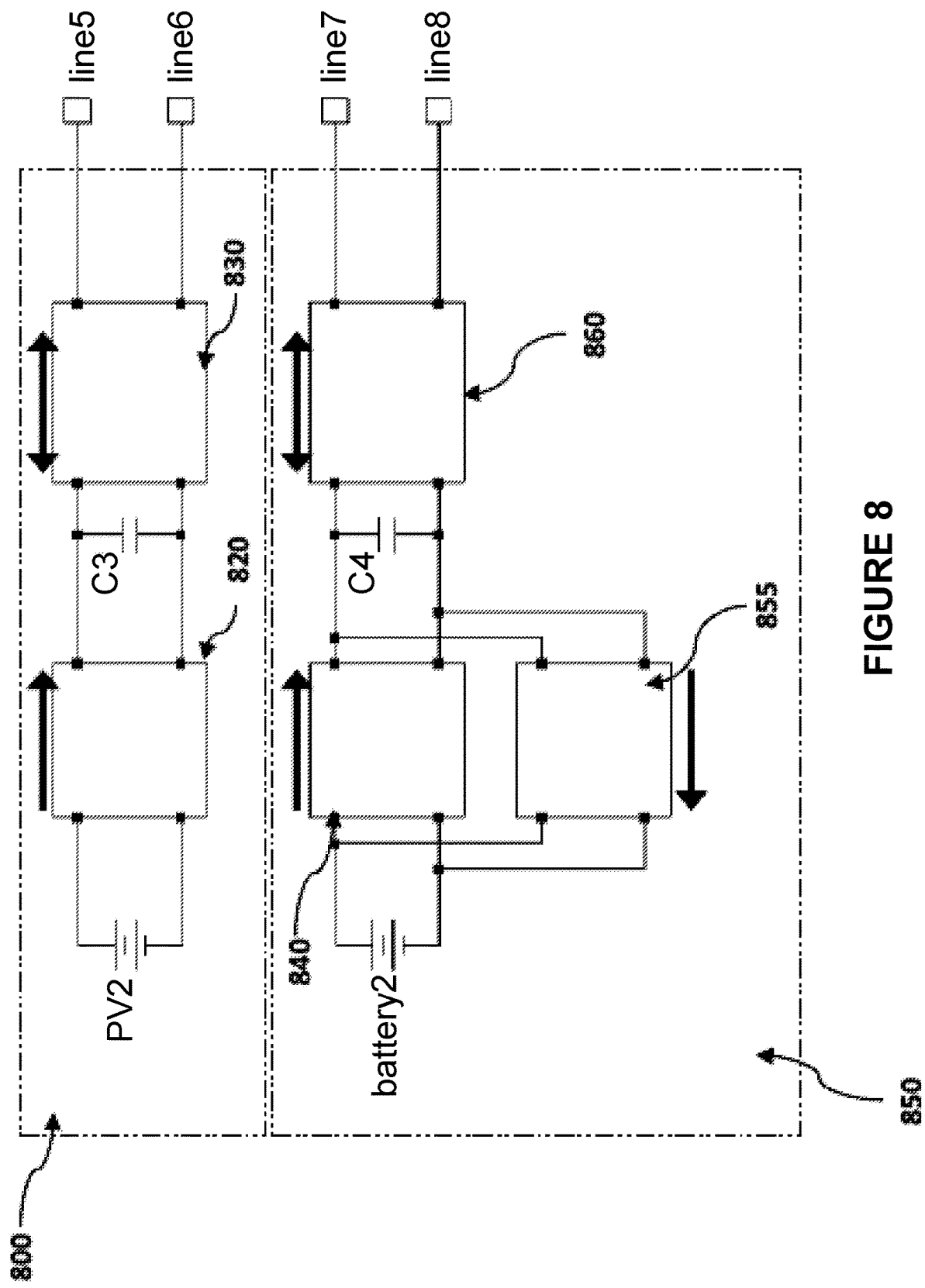
FIG. 8 is a simplified schematic diagram of another embodiment of a hand carryable portable power system.

FIG. 8 illustrates a simplified schematic block diagram of another embodiment of a portable power system. The power system in FIG. 8 is similar to that of the one illustrated in FIGS. 6 and 7 except that the non-isolated DC-to-DC converter 610 has been removed. Since DC-to-DC isolation stages 820 and 840 can provide both regulation and isolation (just as can 620 and 640), there is no need for the additional non-isolated regulation stage connected to PV1. When PV power system 800 remains independent of battery power system 850, there is no difference in functionality to the power system illustrated in FIGS. 6 and 7.

Figure 9:
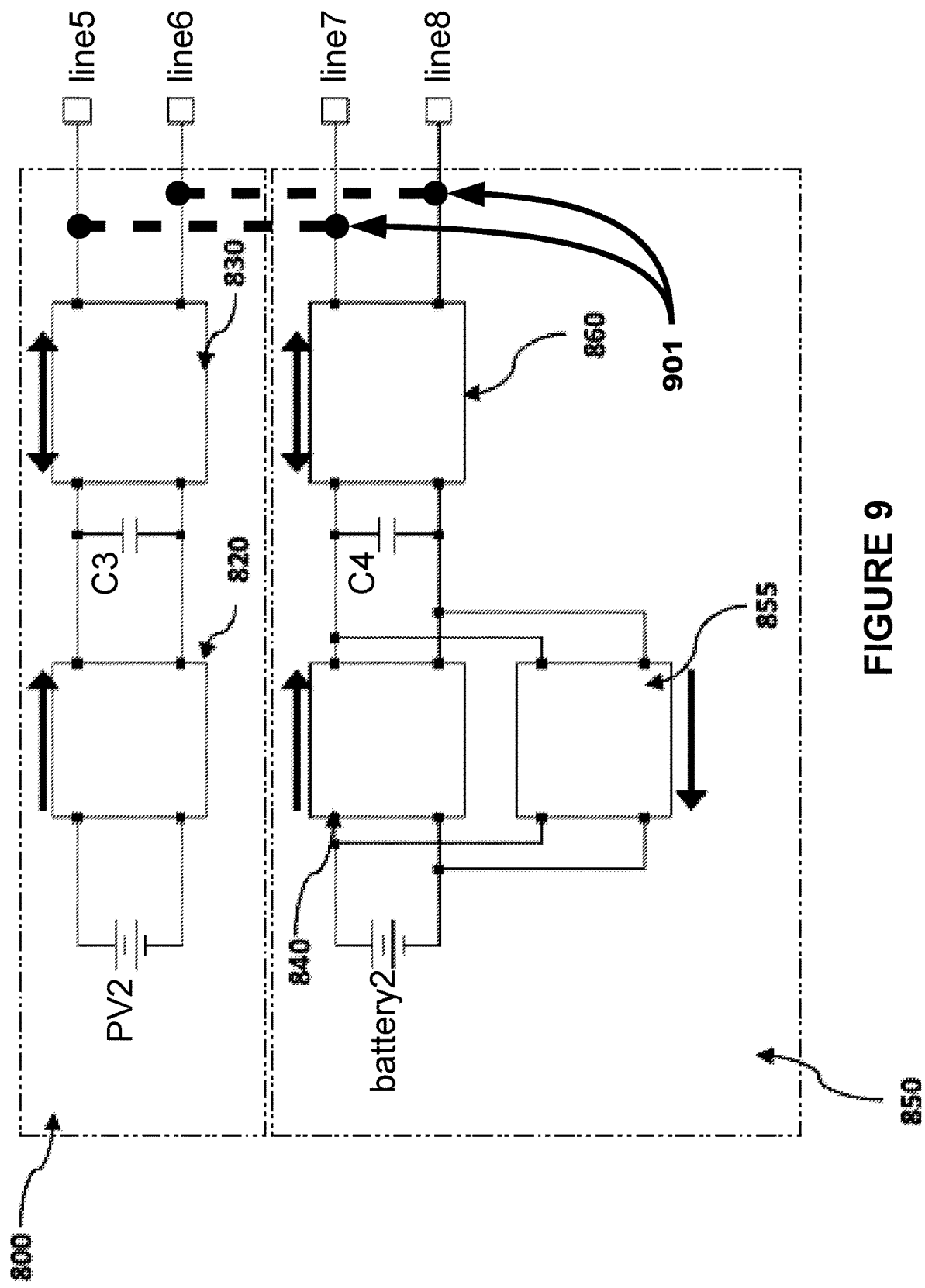
FIG. 9 is a simplified schematic diagram of the hand carryable portable power system shown in FIG. 8 in another configuration.

FIG. 9 illustrates a simplified schematic block diagram of the power system represented in FIG. 8 in which the PV power system 800 is electrically coupled to the battery power system 850. Dashed lines 901 represent the electrical power coupling between PV power system 800 and battery power system 850. Note that when the charger 855 is located inside the battery power system 850, there is no need for an electric power coupling between the battery and the photovoltaic panel as there was for the power system shown in FIGS. 6 and 7. If charger 855 was moved to the PV power system 800 then additional electric power coupling would need to be added between the output of the charger and the battery terminals.

The only difference in functionality between the power systems shown in FIG. 7 and FIG. 9 is the method for using the battery in load leveling for a stand-alone system (not grid-connected) when the load power is changing relative to the available photovoltaic power. For the system in FIG. 7, the battery is charged from converter 610 whereas in FIG. 9, the battery is charged from charger 855. That is, for the system in FIG. 9, the PV panel provides alternating-current power between line3 and line4 which is then pushed back through full-bridge inverter 860 and then charger 855 to charge the battery. The battery charging path for the system in FIG. 9 involves many more stages of power conversion and entails greater losses that the battery charging path for the system in FIG. 7. Also, whereas adjusting the amount of battery charging at any given time in FIG. 7 occurs naturally between the output of dc-to-dc converter 610 and the battery without any additional control, the system shown in FIG. 9 needs to implement more complex control of the battery charging. The controller of the system shown in FIG. 9 must adjust the amount of power flowing through charger 855 to maximize power from the photovoltaic panel up to the level required to satisfy the load power and not exceed the required power for charging the battery. However, if power stages 820, 830, and 860 are designed to operate at high efficiency, the overall system efficiency of the hand carryable portable power system shown in FIG. 8 is likely to exceed the overall system efficiency of the hand carryable portable power system shown in FIG. 6 due to the presence of power stage 610.

Figure 10:
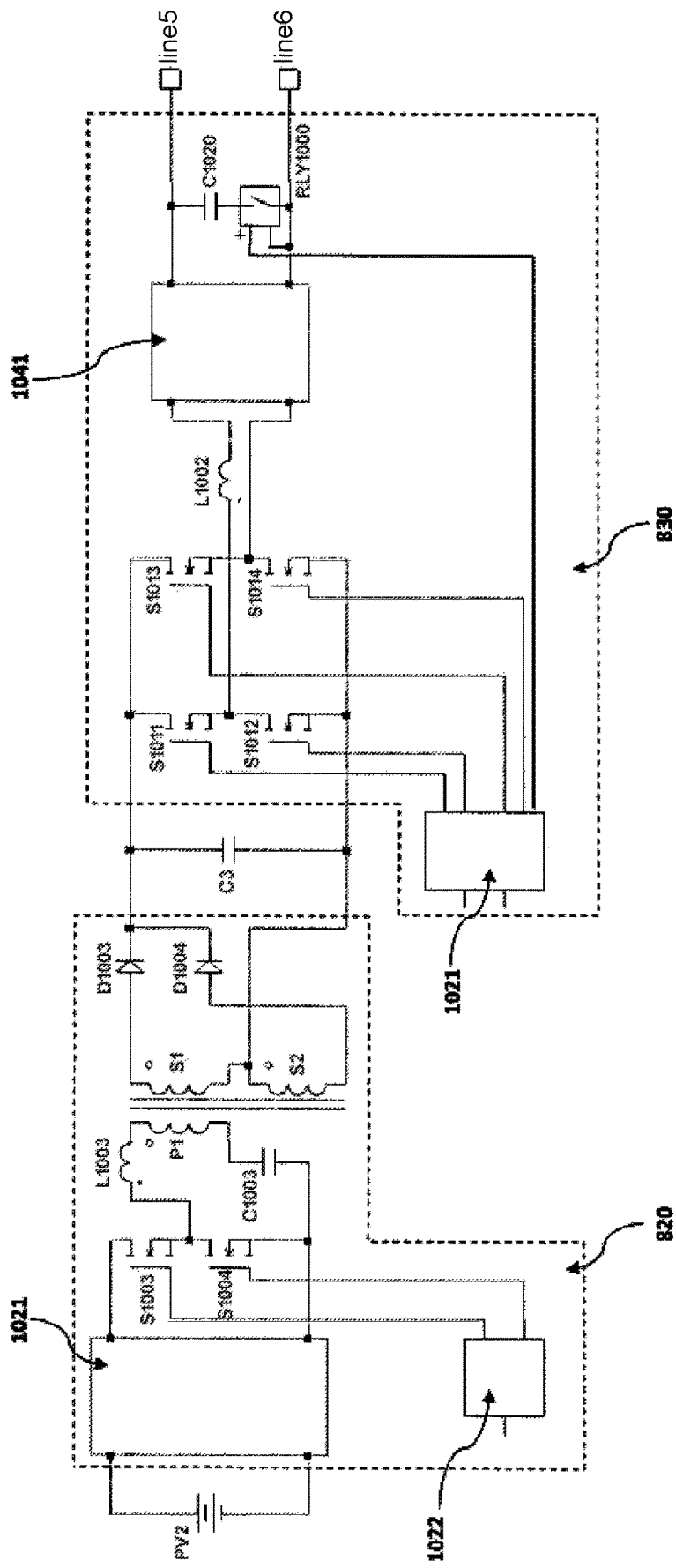
FIG. 10 is a simplified schematic diagram of a hand carryable portable power system constructed in accordance with another embodiment.

FIG. 10 illustrates a simplified schematic of the PV box block diagram schematic 800 that was illustrated in FIGS. 8 and 9. Isolated DC-to-DC converter 820 comprises DC EMI filter 1021, and an LLC converter comprising a half-bridge formed by MOSFETs S1003 and S1004 as well as transformer TX1002, diode rectifiers D1003 and D1004, resonant inductor L1003, resonant capacitor C1003, and controller 1022. The output from isolated DC-to-DC converter 820 is coupled to capacitor C3. Capacitor C3 is coupled to full-bridge inverter 830 comprising a first half-bridge formed by MOSFETs S1011 and S1012, a second half-bridge formed by MOSFETs S1013 and S1014, controller 1021, inductor L1002, AC EMI filter 1041, and output capacitor C1020 with relay RLY1000.

DC EMI filter 1021 and AC EMI filter 1041 are provided to filter out high-frequency current and thus reduce electromagnetic interference produced by the power system. Other than reduction of electromagnetic interference, filters 1021 and 1041 have no appreciable effect on the performance or functioning of the power system, so subsequent discussions will not discuss these elements further.

The LLC converter in Isolated DC-to-DC converter 820 operates as follows: Controller 1022 produces approximately 50% duty cycle synchronous gate drive signals to MOSFETs S1003 and S1004 that are 180 degrees out-of-phase with respect to each other. The duty cycle is slightly less than 50% in order to produce a dead-time to prevent simultaneous conduction of the two MOSFETs and to allow resonant switching to occur. A resonant tank is composed of passive components capacitor C1003, inductor L1003, and parasitic magnetizing and leakage inductances of transformer TX1002. Note that in some LLC converter designs, the parasitic leakage inductance of TX1002 is large enough that inductor L1003 is not needed. Due to the magnetizing inductance of TX1002 which acts as an inductance in parallel with load of the LLC converter and the leakage inductance of TX1002 in series with L1003 which acts as a series inductance of the load of the LLC converter, the LLC converter acts as a hybrid between a series resonant and parallel resonant converter. There are two resonant frequencies due to two inductor values and one capacitor value (and hence the name LLC converter). The parallel inductance allows the system to have an overall voltage gain (beyond the turns ratio of transformer TX1002).

Diodes D1003 and D1004 rectify the high-frequency alternating current voltage across transformer TX1002 secondaries S1 and S2 to produce a direct current voltage across capacitor C3. Controller 1022 controls the frequency of the gate drives to S1003 and S1004 in such a way as to operate the converter above its lower resonant frequency. As the operating frequency is changed, the system gain changes, thus allowing voltage regulation of capacitor C3. Increasing the switching frequency decreases the voltage across C3. Transformer TX1002 also provides a high voltage isolation boundary. The turns ratio of transformer TX1002 allows a small voltage across PV2 (such as 20V) to be stepped up to a large voltage across C3 (such as 450V).

Full-bridge inverter 1040 has two different modes of operation depending on whether the hand carryable portable power system is pushing current into the utility grid or if the power system is powering a stand-alone load. Each case will be considered separately.

In the case when the hand carryable portable power system is pushing current into the utility grid, relay RLY1000 is off (open-circuit) and capacitor C1020 is disconnected from the output. The half-bridge formed by MOSFETs S1011 and S1012 is switched in complementary fashion at the grid frequency (such as 50 Hz or 60 Hz) and in phase with the grid voltage. When the grid voltage is positive, S1011 is on and S1012 is off. Conversely, if the grid voltage is negative, S1011 is off and S1012 is on. The half-bridge formed by MOSFETs S1013 and S1014 is switched at high-frequency and the current through L1002 is monitored. Controller 1021 switches S1013 and S1014 to keep the current through L1002 between a higher and a lower sinusoidal envelope, the average of which represents the desired current to be pushed into the grid. Controller 1021 also periodically attempts to increase the amount of current flowing into the grid until the voltage across capacitor C3 is on the verge of collapsing. Controller 1021 thus provides maximum power point tracking for photovoltaic panel PV2.

In the case when the hand carryable portable power system drives a load that is independent of the grid, relay RLY1000 is closed so that capacitor C1020 is placed across the output terminals. The controller operates MOSFETs S1011 and S1012 in a complementary manner at the desired output frequency of the inverter. MOSFETs S1013 and S1014 are also driven in a complementary fashion, but at high frequency (such as 30 kHz to 100 kHz). When S1012 is ON, the duty cycle of switch S1013 is a rectified half-cycle sinusoid in phase with the desired output voltage. When S1011 is ON, the duty cycle of switch S1014 is a rectified half-cycle sinusoid in phase with the desired output voltage. The duty cycle of switches S1013 and S1014 can operate in open-loop, other than variations for protective functions such as current limiting. The duty cycle of the switches does not need to be adjusted for the load. This method of operation has several advantages including simplicity of control as well as advantages for paralleling inverters. Parallel operation of several converters will be subsequently described.

Figure 11:
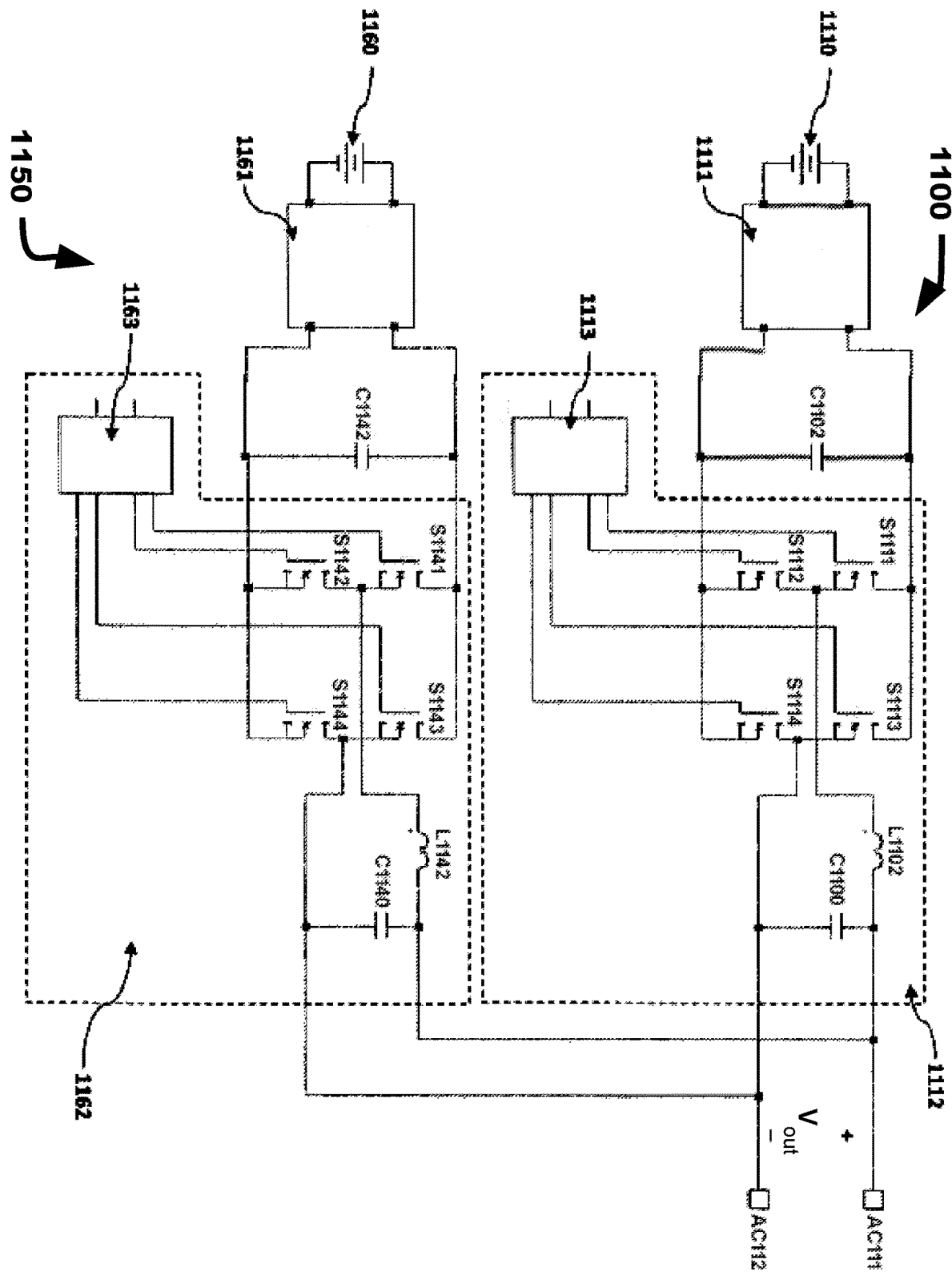
FIG. 11 is a simplified schematic diagram of two full-bridge inverters in parallel according to an embodiment of a hand carryable portable power system.

FIG. 11 illustrates a simplified schematic of two full-bridge inverters wired in parallel and configured to operate in a voltage output stand-alone mode according to an embodiment of a hand carryable portable power system. Detail is provided only for aspects of the design related to placing two or more inverters in parallel. Other details not related to parallel operation of inverters is not necessarily included in FIG. 11. FIG. 11 illustrates two hand-carryable portable power system components 1100 and 1150 with common output terminals AC111 and AC112. The system components 1100 and 1150 could be two battery boxes, two PV boxes, or a battery box and a PV box.

System component 1100 comprises DC source 1110, DC-to-DC isolation stage 1111, capacitor C1102, and full-bridge inverter 1112. System component 1150 comprises DC source 1160, DC-to-DC isolation stage 1161, capacitor C1142, and full-bridge inverter 1162. DC source 1110 can be either a battery or a photovoltaic panel. Similarly, DC source 1160 can be either a battery or a photovoltaic panel.

Figure 12:
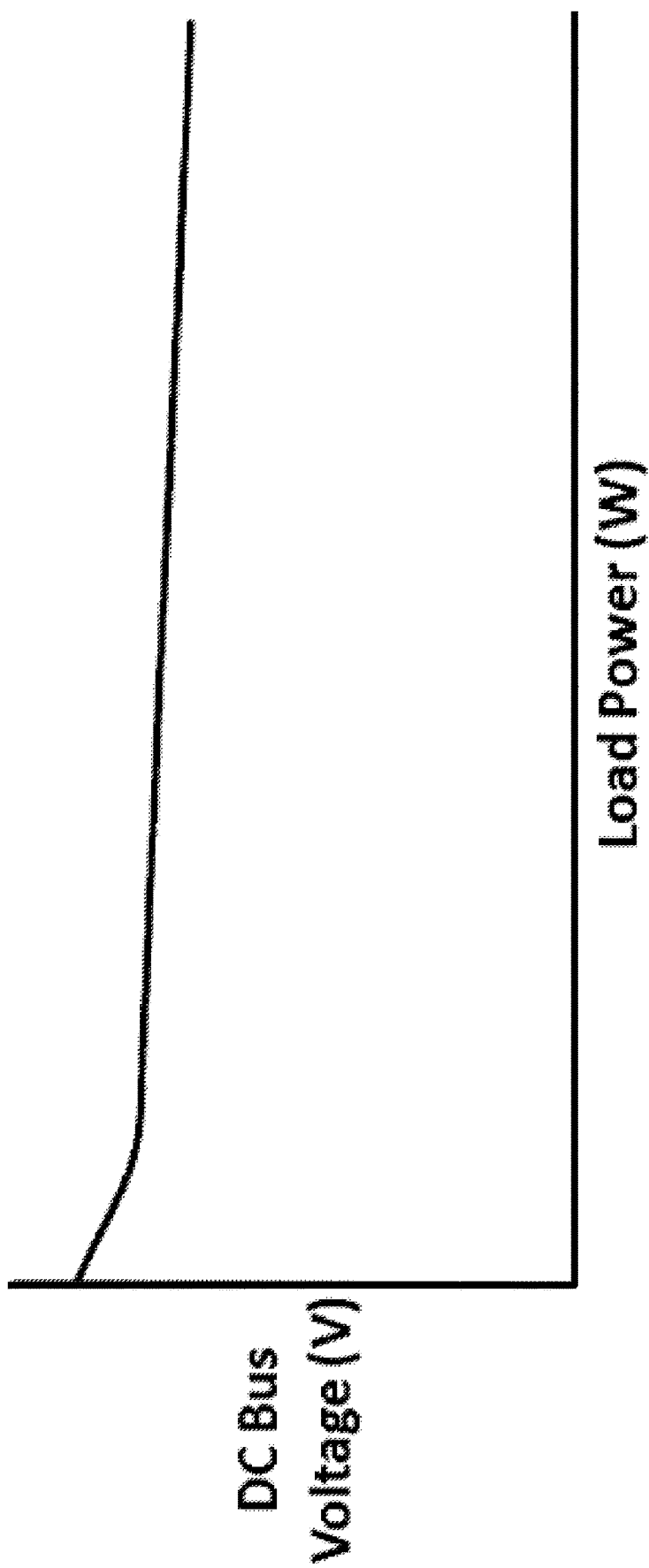
FIG. 12 is a graph of a direct current bus voltage as a function of load voltage in an embodiment of a hand carryable portable power system.

DC-to-DC isolation stages 1111 and 1161 regulate the voltage across C1102 and C1142, respectively, according to a load curve such as the one illustrated in FIG. 12. As shown in FIG. 12, the regulation voltage across the DC bus (either C1102 or C1142 voltage) decreases as the load on the corresponding DC source increases. FIG. 12 illustrates one embodiment of a voltage-load curve. The curve illustrated in FIG. 12 has a steeper slope at a load power near zero than at higher values of load power. The steeper slope is placed there for convenience due to the natural increase in voltage on an LLC converter when the load gets close to zero; however, any other curve will work as well, provided that the DC bus voltage decreases monotonically as the load increases. Typical values of voltage for the curve shown in FIG. 12 might be 495V at no load and 425V at full load.

Turning back to FIG. 11: full-bridge inverters 1112 and 1162 operate in a manner similar to that disclosed for the operation of full-bridge inverter 830 in FIG. 10. Since the relay RLY1000 in FIG. 10 is closed during stand-alone voltage mode, the RLY1000 was replaced with a short circuit in FIG. 11 for purposes of discussion of parallel inverters. Similarly, since the effect of an output AC EMI filter is negligible for purposes of the discussion of parallel inverters, the AC EMI filter was also not shown in full-bridge inverters 1112 and 1162.

AC Controllers 1113 and 1163 share a common sync signal (not shown) which comprises a 50% duty cycle square wave signal at the frequency of the desired output voltage (e.g. 50 Hz). The sync signal is generated by whichever AC controller is designated as the master. The sync signal may be transmitted through either wired or wireless means. For example, the sync signal could be transmitted through a wired electrical coupling between a PV box and a corresponding battery box. The sync signal could be transmitted through a cable that is attached to the AC outputs of each inverter in a system, such cable also comprising a signal wire that carries the sync signal. The sync signal could also be transmitted wirelessly through, for example, a blue-tooth interface. The sync signal can also be transmitted to more than one unit (from the master unit) to enable sharing loads among more than two inverters.

Due to the sync signal, the state of MOSFETs S1111 and S1112 will be the same as the state of MOSFETs S1141 and S1142 respectively, since these four MOSFETs are switched at low frequency (e.g. 50 Hz) and any small errors in timing of the sync signal to each of the two inverters will be negligible compared to the low frequency of operation of those two MOSFETs. In addition, due to the sync signal, the high-frequency pulse-width-modulated duty cycle of MOSFETs S1113 and S1114 will be the same as the high-frequency pulse-width-modulated duty cycle of MOSFETs S1143 and S1144, respectively. Due to small timing errors and delays in the sync signal reaching each inverter, it is possible that the state of MOSFETs S1113 and S1114 might not be the same as the state of MOSFETs S1143 and S1144 respectively; however, the pulse-width-modulated duty cycles at any given instant in time will be the same between the two inverters.

For purposes of analysis, the circuit shown in FIG. 11 can be simplified at a given instant in time, based on the state of the low-frequency MOSFETs S1111, S1112, S1141, and S1143. For the case of a positive output voltage from line AC111 to line AC112, MOSFETs S1111 and S1141 are ON and S1112 and S1142 are OFF. The circuit in FIG. 11 then simplifies to the circuit in FIG. 13, where MOSFETs that are ON have been replaced with short circuits and MOSFETs that are OFF have been replaced with open circuits. MOSFETs that are switching at high-frequency have been left in the schematic as is.

Figure 13:
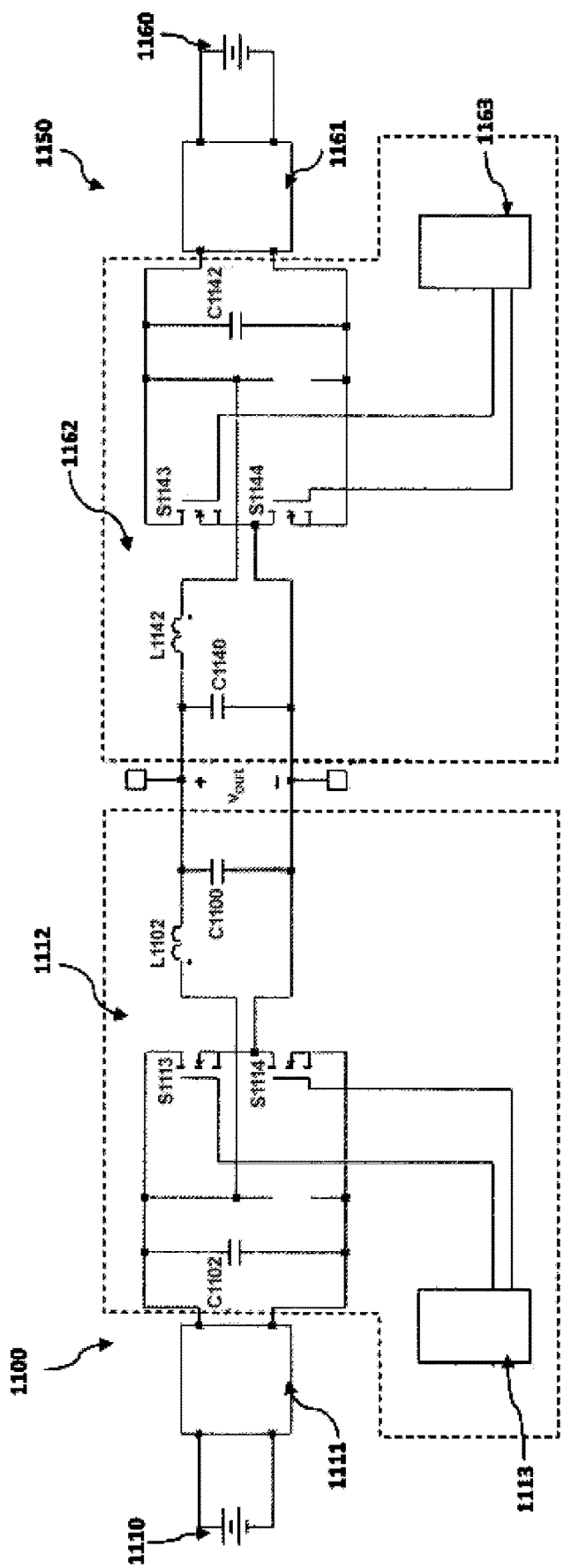
FIG. 13 is a simplified schematic diagram of the diagram of FIG. 11 under specific operating conditions for purposes of analysis.

Looking at the simplified schematic illustrated in FIG. 13, one can see that full-bridge inverter 1112 components C1102, S1113, S1114, L1102, and C1100 form a synchronous buck converter. Similarly, full-bridge inverter 1142 components C1141, S1143, S1144, L1142, and C1140 also form a synchronous buck converter. The steady state voltage at the output of the two synchronous buck converters is equal to $v_{out}$ (the voltage across C1100 and C1140). The input voltage of the first synchronous buck converter is equal to the voltage across C1102 which will be designated as $V_{C1102}$. Similarly, the input voltage of the second synchronous buck converter is equal to the voltage across C1142 which will be designated as $V_{C1142}$. The duty cycle of switches S1113 and S1143 will be the same and will be designated as D. The average voltage across S1114 and S1144 will be $(1-D)*V_{C1112}$ and $(1-D)*V_{C1142}$ respectively. The average voltage across L1102 and L1442 will be zero. The average voltage at $v_{out}$ will therefore be equal to $V_{C1112}-(1-D)*V_{C1112}=D*V_{C1112}$ and also the average voltage at $v_{out}$ will be equal to $V_{C1142}-(1-D)*V_{C1142}=D*V_{C1142}$. Since the duty cycle of the switches S1113 and S1143 is the same, $V_{C1112}$ will be the same as $V_{C1142}$.

For the case of a negative output voltage from line AC111 to line AC112, MOSFETs S1111 and S1141 are OFF and S1112 and S1142 are ON. An analysis of this case will also show the equivalent circuit is two synchronous buck converters which must have the same input voltages (i.e. $V_{C1112}$ will be the same as $V_{1142}$).

Now that it has been established that the capacitor bus voltage across each inverter must be the same during parallel operation, power sharing among all of the parallel inverters can be arranged by adding a voltage droop to the capacitor bus voltage as illustrated in FIG. 12. That is because any given capacitor bus voltage occurs only at a specific power level, so identical bus voltage values in more than one inverter implies that the power level in each of the inverters will be the same.

To summarize, power sharing will occur between several inverters as described in the present invention provided the following criteria are satisfied:

Both sets of half-bridge MOSFETs are driven with complementary drives (upper switch with respect to lower switch).

One set of half-bridge MOSFETs is driven at the frequency of the output voltage (e.g. 50 Hz).

The second set of half-bridge MOSFETs is driven with a high-frequency pulse-width-modulated duty cycle such that the lower MOSFET duty cycle varies proportionally to the desired output voltage (e.g. sinusoidal to produce a sinusoidal output voltage).

The bus voltage at the input of each inverter is regulated to be reduced as the power level increases and the bus voltage versus power curve is the same or nearly the same for all inverters which are to share load power with one another.

The same technique demonstrated for producing power sharing between several inverters can also be used to cause a battery-driven inverter that is in parallel with a photovoltaic-driven inverter to only start taking load when the photovoltaic-driven inverter reaches the power capacity of the photovoltaic panels. To implement such a scheme, the voltage versus power curve of the battery-driven inverter should be reduced (in voltage) compared with the voltage versus power curve of the photovoltaic-driven inverter. The battery driven-inverter will therefore not start to take any load until the bus voltage of the photovoltaic-driven inverter has started to collapse, implying that the capacity of the photovoltaic panel has been reached.

Figure 14:
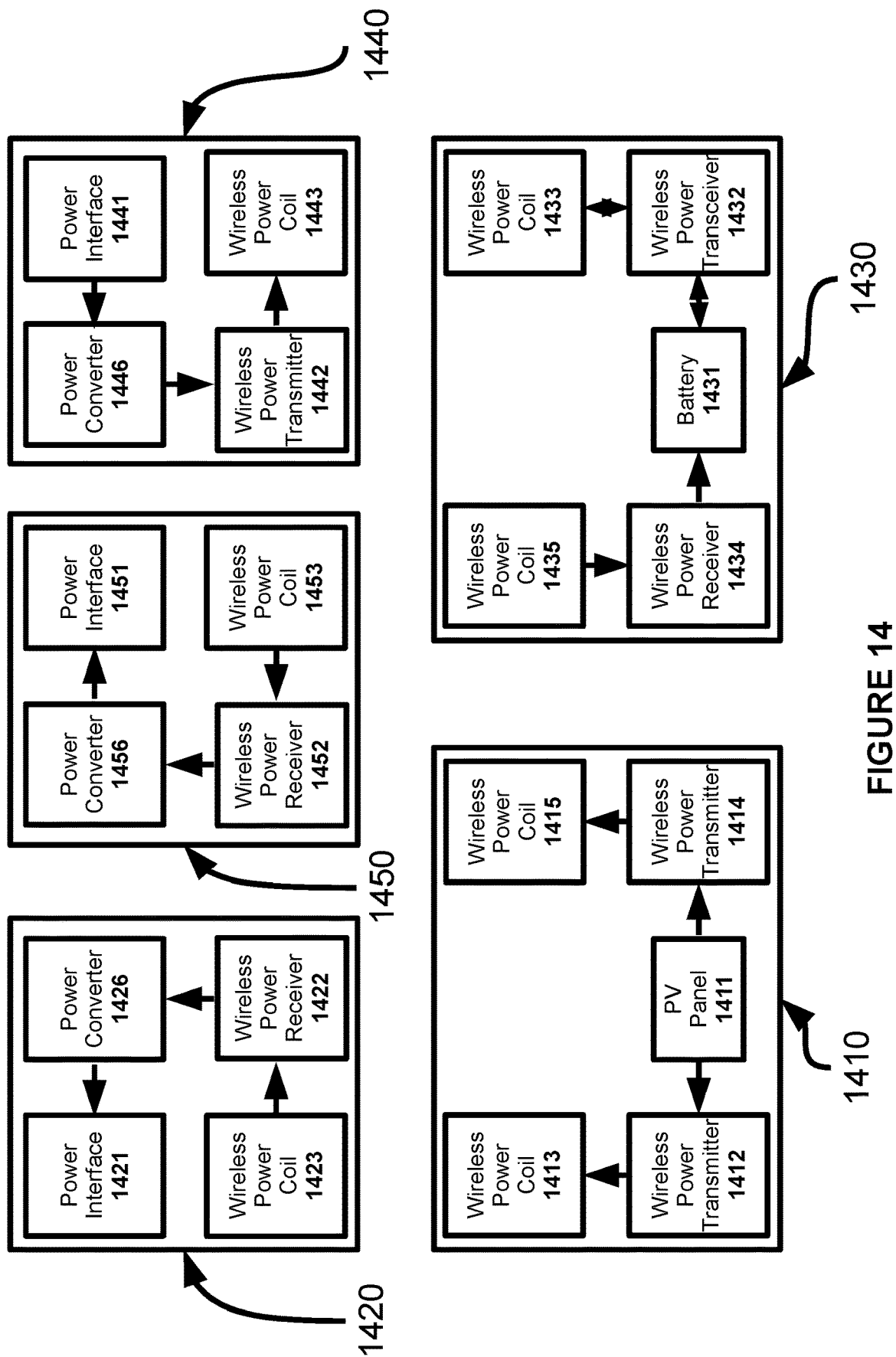
FIG. 14 is a block diagram of system components of a hand carryable portable power system constructed in accordance with another embodiment.

Turning now to FIG. 14: FIG. 14 illustrates block diagrams of system components of another embodiment of a hand carryable portable power system that uses wireless power transmission. The wireless power system components illustrated in FIG. 14 are similar to components used in the wireless power system illustrated in FIG. 5, except that the power interface system components in FIG. 14 are located on detachable blocks that are coupled to the portable power system through additional wireless power interfaces.

The portable power system components illustrated in FIG. 14 comprise PV Module Block 1410, Battery Module 1430, and Power Interface Blocks 1420, 1440, and 1450. PV Module Block 1410 comprises PV Panel 1411, Wireless Power Transmitter 1412, Wireless Power Coil 1413, Wireless Power Transmitter 1414, and Wireless Power Coil 1415. Battery Module 1430 comprises Battery 1431, Wireless Power Transceiver 1432, Wireless Power Coil 1433, Wireless Power Receiver 1434, and Wireless Power Coil 1435. Power Interface Block 1420 comprises Power Interface 1421, Wireless Power Receiver 1422, Power Converter 1426, and Wireless Power Coil 1423. Power Interface Block 1440 comprises Power Interface 1441, Wireless Power Transmitter 1442, Power Converter 1446, and Wireless Power Coil 1443.

Wireless Power Interface 1420 receives wirelessly transmitted power through Wireless Power Coil 1423 and Wireless Power Receiver 1422. Wireless Power Coil 1423 and Wireless Power Receiver 1422 may be designed according to standard methods known in the art such as according to Qi or A4WP standards. Power Converter 1426 converts the power received by Wireless Power Receiver 1422 to an appropriate voltage or current for an intended application such as for example 5 VDC or 230 VAC at 50 Hz. Power Interface 1421 provides a method to electrical couple the power to an external load such as, but not limited to, a USB charging port, a 12V cigarette lighter socket, or an AC outlet.

Wireless Power Interface 1440 is similar to Wireless Power Interface 1420 except that the power flow is in the opposite direction. Power Interface 1441 provides power to Power Converter 1446 from an external source. For example, Power Interface 1441 may comprise a standard AC electrical cord that can receive power from a 230 VAC socket, or Power Interface 1441 may comprise a male cigarette lighter plug that can receive power from a 12V cigarette lighter socket. Power Converter 1446 converts power from Power Interface 1441 to a voltage that can be used by Wireless Power Transmitter 1442, for example, a DC voltage in the range of 5V to 30V. Wireless Power Transmitter 1442 transmits power through Wireless Power Coil 1443. Wireless Power Coil 1443 and Wireless Power Transmitter 1442 may be designed according to standard methods known in the art such as according to Qi or A4WP standards.

Power Interface 1450 is identical to Power Interface 1420 with Power Interface 1451 replacing Power Interface 1421, Wireless Power Receiver 1452 replacing Wireless Power Receiver 1422, Wireless Power Coil 1453 replacing Wireless Power Coil 1423, and Power Converter 1456 replacing Power Converter 1426. The operation of Power Interface 1450 will therefore not be further described for the sake of brevity.

PV Module Block 1410 comprises PV Panel 1411. PV Panel 1411 produces electrical energy when light shines on it. The output of PV Panel 1411 is coupled to Wireless Power Transmitters 1412 and 1414. Wireless Power Transmitter 1414 can transmit electrical energy from PV Panel 1411 through Wireless Power Coil 1415 and Wireless Power Transmitter 1412 can transmit electrical energy from PV Panel 1411 through Wireless Power Coil 1413. Wireless Power Transmitter 1412 is configured to transmit power to Power Interface 1420 while Wireless Power Transmitter 1414 is configured to transmit power to Battery Module 1430. Wireless Power Transmitters 1412 and 1414 can operate simultaneously or either can operate alone.

Battery Module 1430 comprises Battery 1431. Battery 1431 can both produce and absorb electrical energy. The output of Battery 1431 is coupled to Wireless Power Receiver 1434 and Wireless Power Transceiver 1432. Wireless Power Transceiver 1432 can function as either a Wireless Power Transmitter or as a Wireless Power Receiver and will switch between transmission or reception depending on whether Battery 1431 needs to provide or absorb power. Wireless Power Transceiver 1432 can transmit or receive electrical energy from or to Battery 1431 through Wireless Power Coil 1433 and Wireless Power Receiver 1434 can receive electrical energy to Battery 1431 through Wireless Power Coil 1435. Wireless Power Receiver 1434 is configured to receive power from PV Module Block 1410 while Wireless Power Transceiver 1432 is configured to either transmit power to Power Interface 1450 or receive power from Power Interface 1420. Wireless Power Receiver 1434 and Wireless Power Transceiver 1432 can operate simultaneously or either can operate alone.

There are many workable combinations of blocks 1410, 1420, 1430, 1440, and 1450. Some of these combinations are illustrated in FIGS. 15-19.

Figure 15:
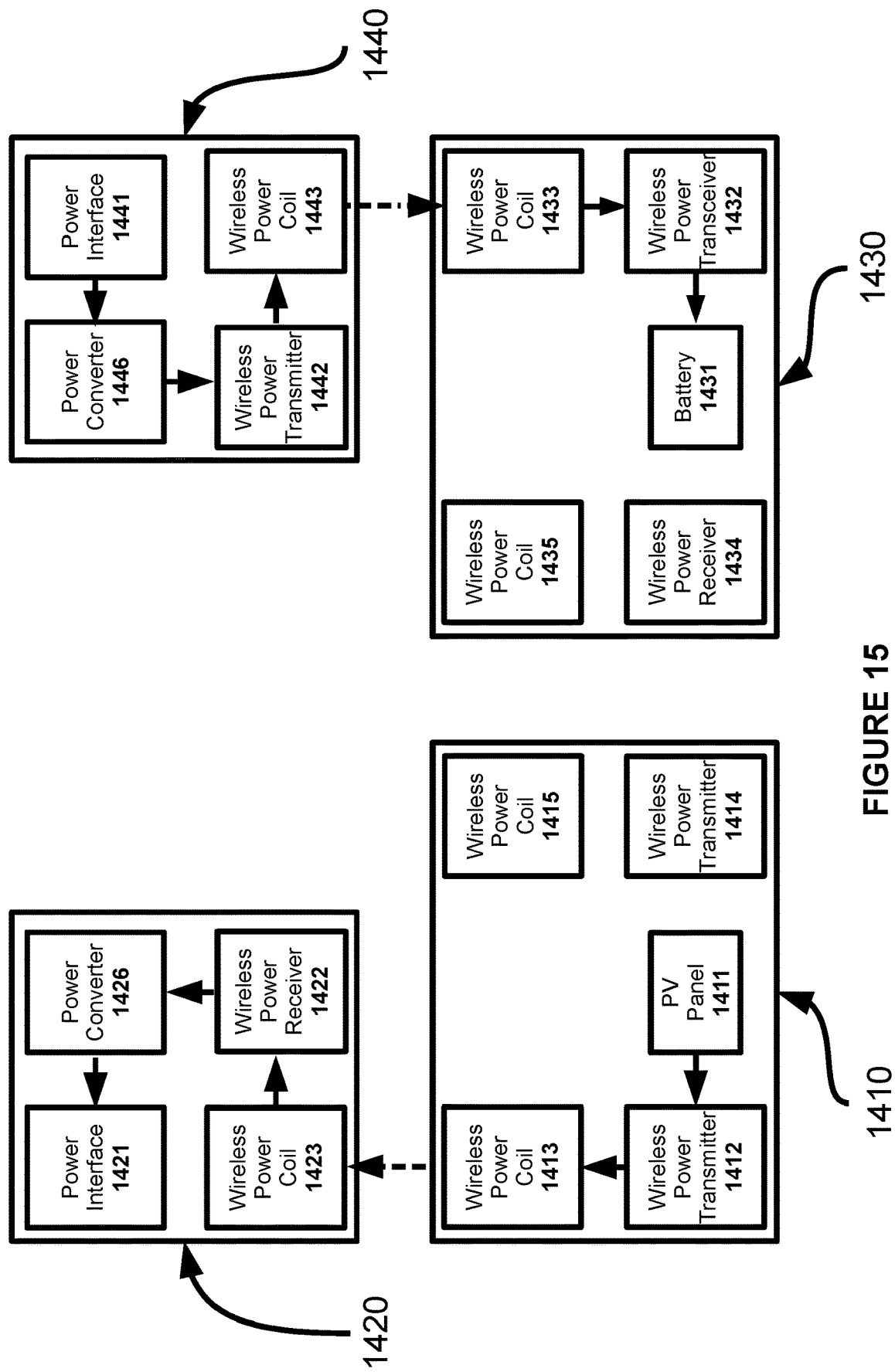
FIG. 15 is a block diagram of the system components of FIG. 14 in another configuration.

Turning now to FIG. 15: illustrated is a configuration of the embodiment that was illustrated in FIG. 14. PV Module 1410 is coupled to Wireless Power Interface 1420 and Battery Module 1430 is coupled to Wireless Power Interface 1440. The system illustrated in FIG. 15 comprising PV Module 1410 is completely independent from the system comprising Battery Module 1430. The system comprising PV Module 1410 may be connected to a utility grid to provide power from the PV Panel 1411 into the grid or it may be connected to a load to provide power from the PV Panel to the load. The system comprising Battery Module 1430 may be connected to a source of power such as a utility grid or a 12V battery to charge Battery 1431.

PV Panel 1411 provides power to Wireless Power Transmitter 1412. Wireless Power Transmitter 1412 transmits the power from PV Panel 1411 to Wireless Power Receiver 1422 via Wireless Power Coils 1413 and 1423. Wireless Power Receiver 1422 provides the power from PV Panel 1411 to Power Converter 1426 which in turns converts the power from PV Panel 1411 to a voltage or current which is appropriate for an application such as pushing current into a 230V, 50 Hz utility grid connection or providing 230V, 50 Hz to a load, or providing a DC Power such as 12V or 5V to a load. Wireless Power Coil 1415 is not coupled to any device and Wireless Power Transmitter 1415 is inactive.

Power Interface 1441 may be coupled to a power source such as a utility grid connection or a car cigarette lighter. Power Converter 1446 converts the power coming into Power Interface 1441 into a DC voltage appropriate for providing power to Wireless Power Transmitter 1442 such as 5V to 30V. Wireless Power Transmitter 1442 then transmits the power through Wireless Power Coils 1443 and 1433 to Wireless Power Transceiver 1432. Wireless Power Transceiver 1432 then uses the received power to charge Battery 1431.

Figure 16:
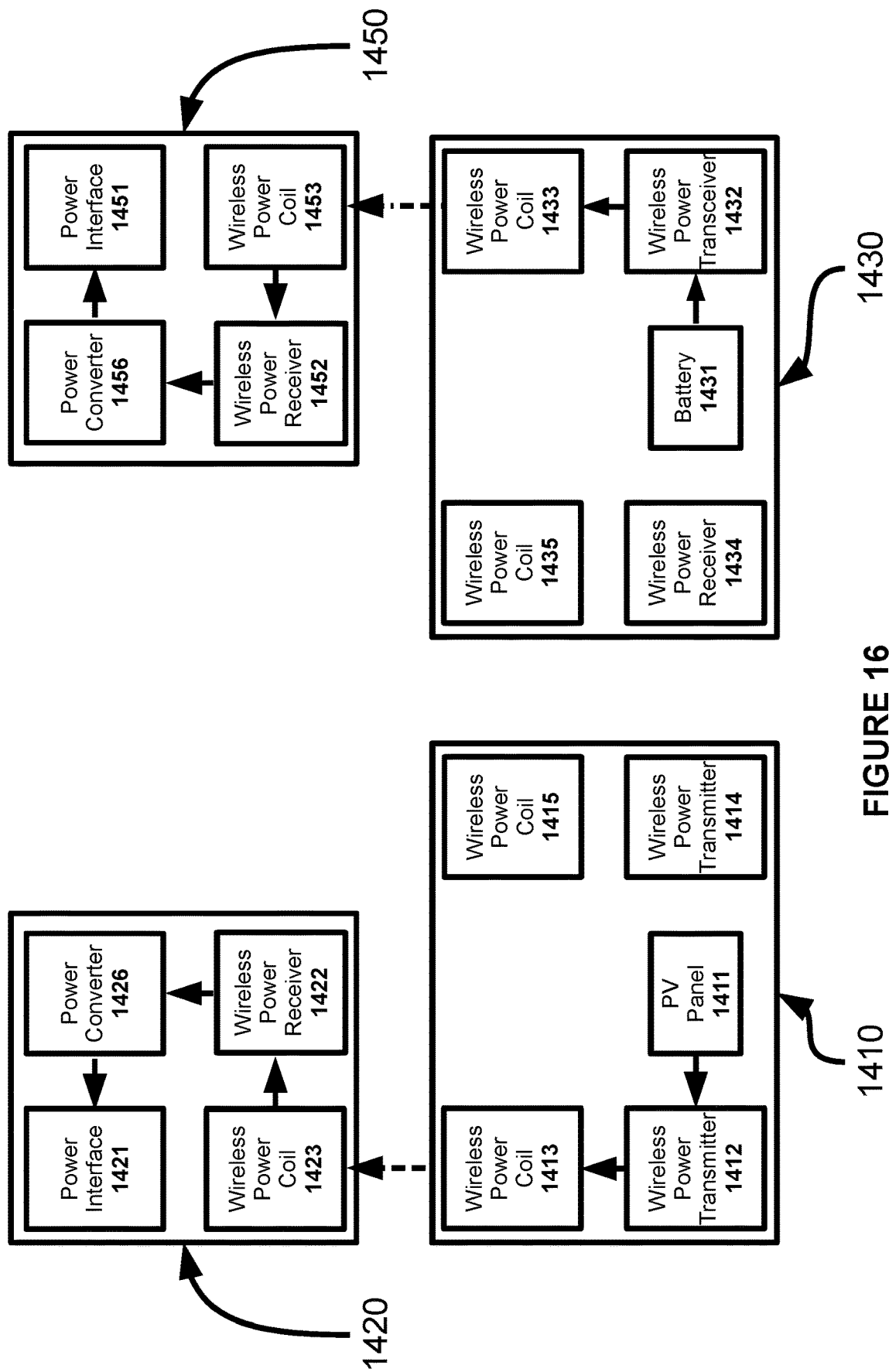
FIG. 16 is a block diagram of the system components of FIG. 14 in another configuration.

Turning now to FIG. 16: illustrated is another configuration of the embodiment that was illustrated in FIG. 14. Whereas FIG. 15 illustrates a configuration in which Battery 1431 is being charged from a power source, FIG. 16 illustrates a configuration in which Battery 1431 is being discharged into a load. The system comprising PV Module 1410 and Wireless Power Interface 1420 in FIG. 16 is identical to the system comprising PV Module 1410 and Wireless Power Interface 1420 in FIG. 15 so the operation of that part of the system in FIG. 16 will not be described again.

For the configuration illustrated in FIG. 16, Battery Module 1430 is coupled to Wireless Power Interface 1450. Battery 1431 provides power to Wireless Power Transceiver 1432 which then transmits that power to Wireless Power Receiver through Wireless Power Coils 1433 and 1453. Wireless Power Receiver 1452 provides that power to Power Converter 1456 which in turn converts the power to a voltage or current which is appropriate for an application such as providing 230 VAC, 50 Hz to a load, or providing a DC Power such as 12V or 5V to a load. Wireless Power Coil 1435 is not coupled to any device and Wireless Power Receiver 1434 is inactive. Power Interface 1451 may be coupled to a load such as a 230 VAC load or a 5V or 12 VDC load.

Figure 17:
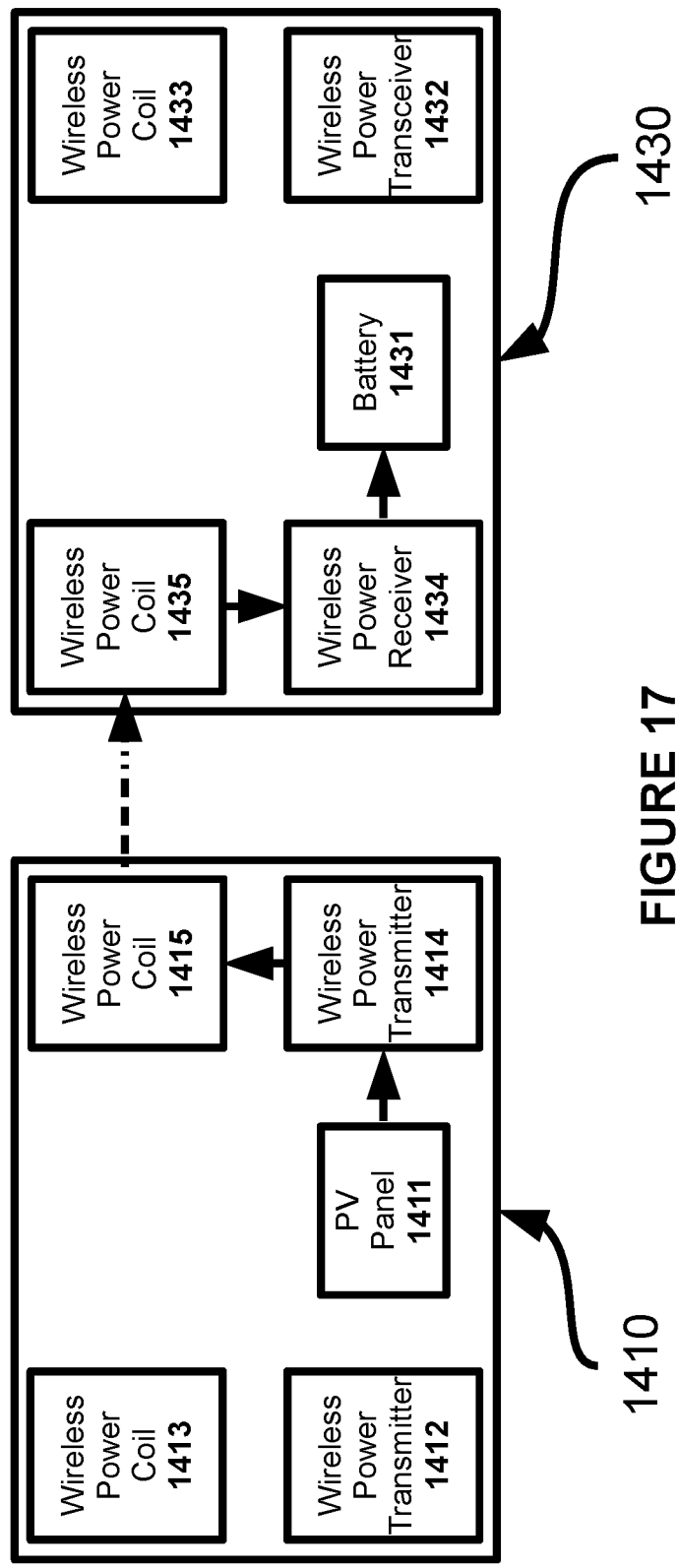
FIG. 17 is a block diagram of the system components of FIG. 14 in another configuration.

Turning now to FIG. 17: illustrated is another configuration of the embodiment that was illustrated in FIG. 14. The configuration illustrated in FIG. 17 does not couple to any external loads or power sources but rather uses power from PV Panel 1411 to charge Battery 1431. Since there are no loads or power sources external to the system, no wireless power interface is needed.

As illustrated in the block diagram in FIG. 17: PV Panel 1411 sends power to Wireless Power transmitter 1414 which in turn transmits that power to Wireless Power Receiver 1434 via Wireless Power Coils 1415 and 1435. Wireless Power Receiver 1434 uses the received power to charge Battery 1431. Wireless Power Coils 1413 and 1433 are not coupled to any load, and Wireless Power Transmitter 1412 and Wireless Power Transceiver 1432 are inactive.

Figure 18:
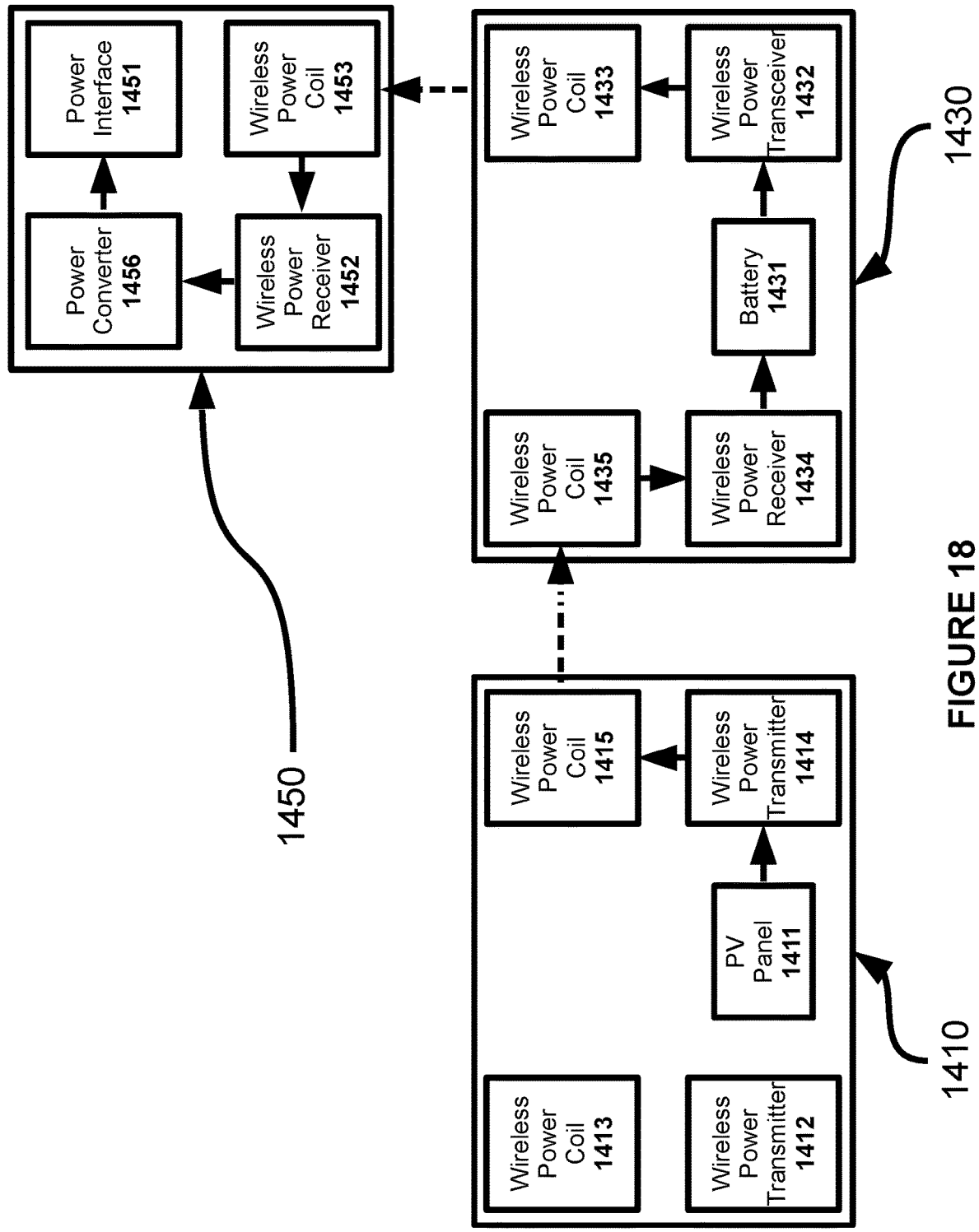
FIG. 18 is a block diagram of the system components of FIG. 14 in another configuration.

Turning now to FIG. 18: illustrated is another configuration of the embodiment that was illustrated in FIG. 14. The configuration illustrated in FIG. 18 is similar to the configuration illustrated in FIG. 17 except that the configuration illustrated in FIG. 18 has a load wirelessly powered from the battery. Battery 1431 is charged over a wireless link from power generated by PV Panel 1411 using the same method as was described for the configuration in FIG. 17 and so will not be described again.

In the configuration illustrated in FIG. 18, the battery also discharges by sending power to Power Converter 1456 via Wireless Power Transceiver 1432, Wireless Power Coils 1433 and 1453, and Wireless Power Receiver 1452. Power Converter 1456 converts the power to a voltage or current which is appropriate for an application such as providing 230 VAC, 50 Hz to a load, or providing a DC Power such as 12V or 5V to a load.

Figure 19:
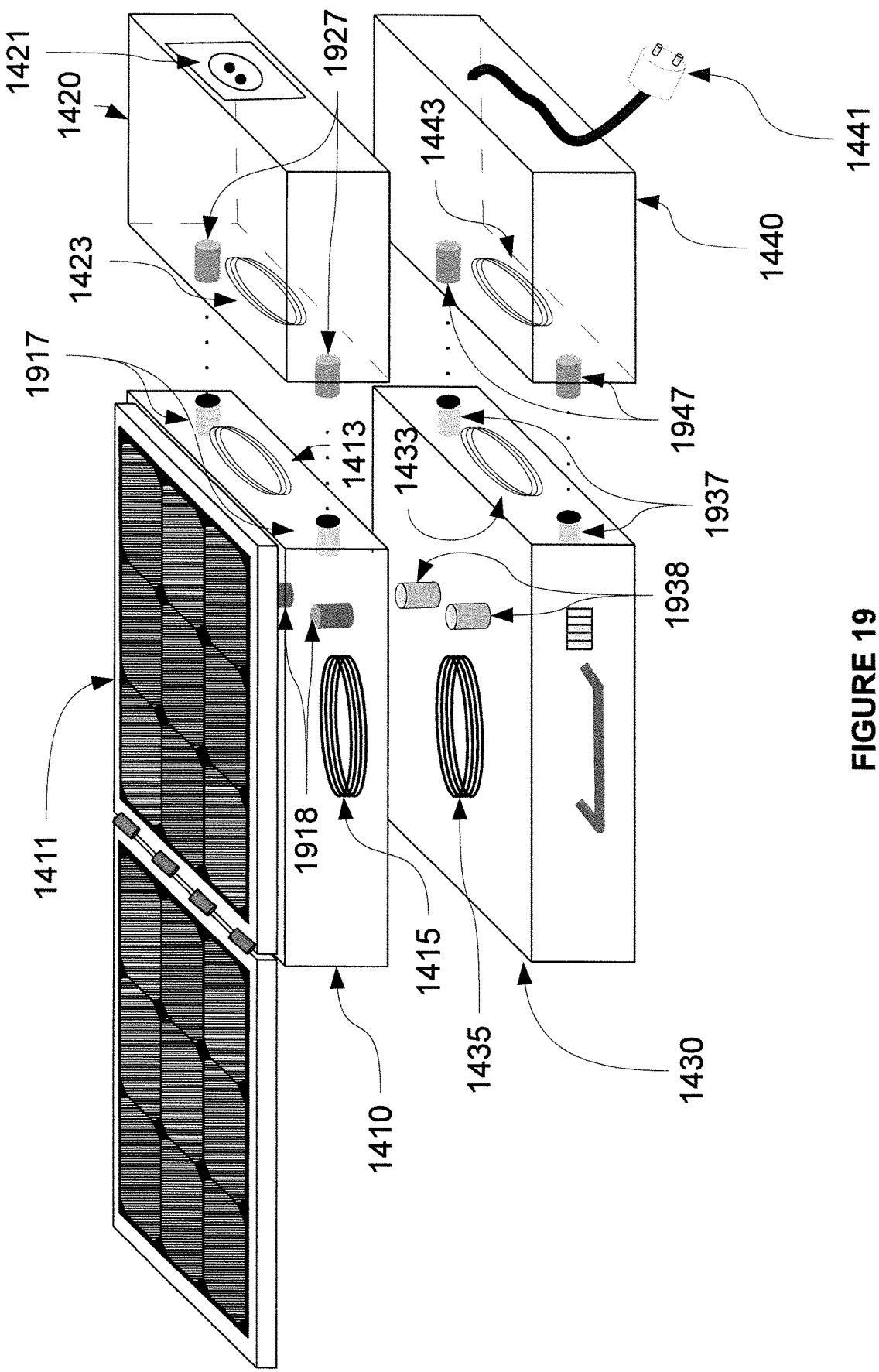
FIG. 19 is a perspective view of a hand carryable portable power system corresponding to the components represented in the block diagram of FIG. 14.

Turning now to FIG. 19, illustrated is a physical model for the system components that were illustrated in block diagram form in FIGS. 14-18. FIG. 19 also illustrates components that hold various system components aligned and held to one another. Pins 1938 can mesh with Sockets 1918 to align and hold together PV Module 1410 and Battery Module 1430. Pins 1947 can mesh with Sockets 1937 to align and hold together Wireless Power Interface 1440 and Battery Module 1430. Pins 1927 can mesh with Sockets 1917 to align and hold together Wireless Power Interface 1420 and PV Module 1410. The pin and socket combinations illustrated in FIG. 19 are given as an example of a method for aligning and securing system components to each other. Many other methods as known in the art would work as well.

As illustrated in FIG. 19, Wireless Power Coil 1435 of Battery Module 1430 aligns with Wireless Power Coil 1415 of PV Module 1410 when Pins 1938 mesh with Sockets 1918. Wireless Power Coil 1423 of Wireless Power Interface 1420 aligns with Wireless Power Coil 1413 of PV Module 1410 when Pins 1927 mesh with Sockets 1917. Wireless Power Coil 1443 of Wireless Power Interface 1440 aligns with Wireless Power Coil 1433 of Battery Module 1430 when Pins 1947 mesh with Sockets 1937.

The system components illustrated in FIGS. 14 and 19 comprise two types of wireless power interfaces: Wireless Power Interfaces 1420 and 1450 receive wirelessly transmitted power, providing that power to a power converter which in turn sends that power to a load. Wireless Power Interface 1440 on the other hand received power from a power source, converted that power to a voltage that could be used by a wireless power transmitter, and then wireless transmitted the power. Various combinations of Wireless Power Interfaces 1420, 1440, and 1450 need to be used with various combinations of system components PV Module 1410 and Battery Module 1430 depending on whether PV Module 1410 is transmitting power to an external source (other than to Battery Module 1430) and on whether Battery Module 1430 is receiving power from an external source, transmitting power to an external load, or not interfacing with an external component (other than to PV Module 1410).

Figure 20:
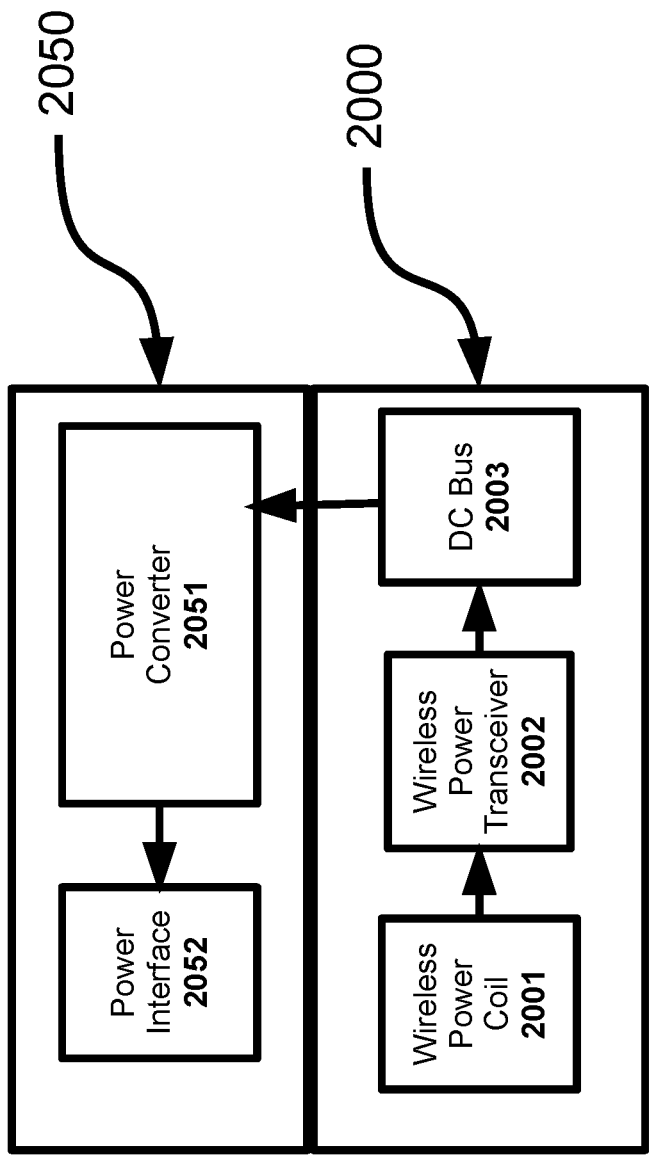
FIG. 20 is a block diagram of a universal wireless interface for use in a portable power system.

Another embodiment of a portable power system is similar to the one illustrated in FIGS. 14-19 except that Wireless Power Interfaces 1420, 1440, and 1450 are each replaced with a single universal wireless interface coupled to an appropriate wired power interface. FIG. 20 illustrates Universal Wireless Interface 2000 coupled to Wired Interface 2050. Universal Wireless Interface 2000 comprises Wireless Power Transceiver 2002 which is capable of both transmitting and receiving wireless power. Wireless Power Transceiver 2002 transmits or receives power through Wireless Power Coil 2001 and is also coupled to DC Bus 2003. DC Bus 2003 could, for example, be a high-voltage DC bus of about 450 VDC or a low-voltage DC bus of about 12V. Power Converter 2051 in Wired Power Interface 2050 couples to DC Bus 2003. Power Converter 2051 converts power to or from DC Bus 2003 and couples to an external power source or load through Power Interface 2052. Wired Power Interface 2050 couples to Universal Wireless Interface 2000 through electrical contacts.

There are many examples of appropriate combinations of Power Converter 2051 and Power Interface 2052 that might be used to interface with Universal Wireless Interface 2000 such that the combination would replace Wireless Power Interfaces 1420, 1440, and 1450 in FIG. 14. Some examples include the following: Power Converter 2051 could be a DC-AC inverter that converts a 450V bus to a sinusoidal current source that synchronizes with a utility grid signal to push power into the grid, such converter also integrating a maximum power point tracking algorithm that seeks to make frequent adjustments of output power until the input DC Bus begins to collapse in order to determine the maximum available power from the DC bus, while Power Interface 2051 could be an AC photovoltaic grid connector. As another example, Power Converter 2051 could be an isolated DC-DC converter that converts a 450 VDC bus to a low-voltage isolated regulated DC voltage such as 5V or 12V while Power Interface 2051 could be a USB charging port or a cigarette lighter socket.

Other effective alternatives will occur to a person skilled in the art. For example, the same circuitry could be used to drive a refuelable battery or a fuel cell. Also, the hand carryable portable power system can be monitored and controlled through a cell phone application by equipping the hand carryable portable power system components with Bluetooth communication. Those skilled in the art should understand that the previously described embodiments of the power system and related methods of operating the same are submitted for illustrative purposes only. In addition, various power converter topologies are well within the broad scope of the present invention. While the portable power system has been described in the environment of an LLC and a bridge topology, it may also be applied to other systems such as, without limitation, a power amplifier and a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A hand carryable apparatus comprising:
    a first power system comprising:
        a first enclosure;
        a photovoltaic panel positioned in or on the first enclosure;
        a first electrical coupling;
        a first power converter having a first output and a first input such that the first input is coupled to the photovoltaic panel through the first electrical coupling; and
        a first electrical interface coupled to the first output of the first power converter;
    a second power system comprising:
        a second enclosure;
        a battery positioned in the second enclosure;
        a second electrical coupling;
        a second power converter having a second output and a second input such that the second input is coupled to the battery through the second electrical coupling; and
        a second electrical interface coupled to the second output of the second power converter;
    a first mechanical coupling for removably connecting the second power system to the first power system;
    a third electrical coupling configured to pass power between the first power system and the second power system,
    the second power system being configured to operate independently of the first power system and the first power system being configured to operate independently of the second power system;
    a direct current bus and a full-bridge inverter, the first power converter or the second power converter further comprising an isolating direct-current-to-direct-current converter coupled to the direct current bus, the direct current bus being coupled to the full-bridge inverter, the full-bridge inverter being coupled to either the first output of the first power converter or the second output of the second power converter,
    the first power converter and the second power converter having alternating current ports; and
    a first controller configured to enable the battery to take up excess load by coupling the first power converter to the second power converter at the alternating current ports of the first power converter and the second power converter by decreasing a direct current bus voltage of one of the power converters as an output power of the one of the power converters increases.

2. The hand carryable apparatus of claim 1, wherein the first mechanical coupling comprises a slot within the first enclosure such that the second enclosure fits into the slot.

3. The hand carryable apparatus of claim 1, wherein the first mechanical coupling comprises a mechanical aligner for aligning the first enclosure to the second enclosure.

4. The hand carryable apparatus of claim 1, wherein the first or second electrical interface comprises an outlet that mates with a standard electrical plug or with an industry-standard photovoltaic system alternating current connector.

5. The hand carryable apparatus of claim 1, wherein the first or second electrical coupling comprises a wireless power interface.

6. The hand carryable apparatus of claim 5, further comprising a second mechanical coupling and a third enclosure that comprises either the first power converter and the first electrical interface or the second power converter and the second electrical interface, the second mechanical coupling being configured to removably couple the third enclosure to either the first enclosure or the second enclosure.

7. The hand carryable apparatus of claim 6, wherein the wireless power interface is configured to function as both a wireless power transmitter and a wireless power receiver.

8. The hand carryable apparatus of claim 1, wherein the third electrical coupling comprises a wireless power transmitter.

9. The hand carryable apparatus of claim 1, wherein the photovoltaic panel is configured to charge the battery through the third electrical coupling.

10. The hand carryable apparatus of claim 1, wherein the first power converter is configured to create a stand-alone alternating current voltage source.

11. The hand carryable apparatus of claim 10, further comprising a capacitor, wherein the first power converter is further configured to operate in a grid-parallel mode in which the first power converter pushes current into the electrical utility grid and to be switched from the grid-parallel mode to a stand-alone mode via switching the capacitor in parallel with the first output and modifying a method of control to an open-loop pulse-width half-bridge modulation that produces a sinusoidal output voltage rather than a closed-loop half-bridge modulation that produces a sinusoidal output current.

12. The hand carryable apparatus of claim 10, wherein the first power converter is configured to operate a load and can appropriately arbitrate power flow into and out of the battery based on available power from the photovoltaic panel and required power for the load in such a way as to optimize a charge state of the battery.

13. The hand carryable apparatus of claim 1, wherein the first power system or the second power system further comprises a wireless communication link for wirelessly monitoring or controlling a flow of power.

14. The hand carryable apparatus of claim 1, wherein the full-bridge inverter comprises a first half-bridge and a second half-bridge, the first half-bridge being configured to be switched at a frequency of an alternating current voltage of a first output voltage of the full-bridge inverter and the second half-bridge being configured to be switched at a high-frequency.

15. The hand carryable apparatus of claim 1, wherein the photovoltaic panel comprises two or three panel sections configured to be folded together into a closed state to occupy a smaller area than when the panel sections are in an open state, the photovoltaic panel being configured to occupy a surface area equal to or smaller than the largest surface of the first enclosure when in the closed state, the photovoltaic panel being configured to occupy a surface area larger than a largest surface of the first enclosure when in the open state.

16. The hand carryable apparatus of claim 1, wherein the first enclosure or the second enclosure further comprises a handle for allowing the apparatus to be carried in a briefcase orientation.

17. The hand carryable apparatus of claim 1, wherein the second enclosure further comprises a display configured to indicate a state-of-charge of the battery, the display being visible when the second enclosure is docked in the first enclosure.

18. A hand carryable apparatus comprising:
a first power system comprising:
   a first enclosure;
   a photovoltaic panel positioned in or on the first enclosure;
   a first electrical coupling;
   a first power converter having a first output and a first input such that the first input is coupled to the photovoltaic panel through the first electrical coupling; and
   a first electrical interface coupled to the first output of the first power converter;
a second power system comprising:
   a second enclosure;
   a battery positioned in the second enclosure;
   a second electrical coupling;
   a second power converter having a second output and a second input such that the second input is coupled to the battery through the second electrical coupling; and
   a second electrical interface coupled to the second output of the second power converter;
a first mechanical coupling for removably connecting the second power system to the first power system;
a third electrical coupling configured to pass power between the first power system and the second power system,
the second power system being configured to operate independently of the first power system and the first power system being configured to operate independently of the second power system;
a direct current bus and a full-bridge inverter, the first power converter or the second power converter further comprising an isolating direct-current-to-direct-current converter coupled to the direct current bus, the direct current bus being coupled to the full-bridge inverter, the full-bridge inverter being coupled to either the first output of the first power converter or the second output of the second power converter; and a first controller configured to enable load sharing of several similar power converters with parallel connected outputs by decreasing the direct current bus voltage of one of the power converters as the output power of the one of the power converters increases.

19. The hand carryable apparatus of claim 18, wherein the first electrical coupling or the second electrical coupling comprises a wireless power interface.

20. A hand carryable apparatus comprising:
a first power system comprising:
   a first enclosure;
   a photovoltaic panel positioned in or on the first enclosure;
   a first electrical coupling;
   a first power converter having a first output and a first input such that the first input is coupled to the photovoltaic panel through the first electrical coupling, the first power converter being configured to create a stand-alone alternating current voltage source; and
   a first electrical interface coupled to the first output of the first power converter;
a second power system comprising:
   a second enclosure;
   a battery positioned in the second enclosure;
   a second electrical coupling;
   a second power converter having a second output and a second input such that the second input is coupled to the battery through the second electrical coupling; and
   a second electrical interface coupled to the second output of the second power converter;
a first mechanical coupling for removably connecting the second power system to the first power system;
a third electrical coupling configured to pass power between the first power system and the second power system,
the second power system being configured to operate independently of the first power system and the first power system being configured to operate independently of the second power system; and
a capacitor, the first power converter being further configured to operate in a grid-parallel mode in which the first power converter pushes current into the electrical utility grid and to be switched from the grid-parallel mode to a stand-alone mode via switching the capacitor in parallel with the first output and modifying a method of control to an open-loop pulse-width half-bridge modulation that produces a sinusoidal output voltage rather than a closed-loop half-bridge modulation that produces a sinusoidal output current.

\* \* \* \* \*